US006801962B2

(12) United States Patent
Taniguchi et al.

(10) Patent No.: US 6,801,962 B2
(45) Date of Patent: Oct. 5, 2004

(54) DATA OUTPUT SYSTEM, MOBILE TERMINAL, DATA OUTPUT METHOD, DATA OUTPUT PROGRAM, AND COMPUTER-READABLE RECORDING MEDIUM STORING DATA OUTPUT PROGRAM

(75) Inventors: Katsuya Taniguchi, Yamatokoriyama (JP); Kyoya Kawano, Yamatokoriyama (JP); Masao Yamamoto, Toyonaka (JP)

(73) Assignee: Sharp Kabushiki Kaisha, Osaka (JP)

(*) Notice: Subject to any disclaimer, the term of this patent is extended or adjusted under 35 U.S.C. 154(b) by 465 days.

(21) Appl. No.: 09/915,087

(22) Filed: Jul. 25, 2001

(65) Prior Publication Data

US 2002/0013869 A1 Jan. 31, 2002

(30) Foreign Application Priority Data

Jul. 26, 2000 (JP) ........................................ 2000-225754
Aug. 29, 2000 (JP) ........................................ 2000-258292

(51) Int. Cl.$^7$ ............................................. G06F 13/00
(52) U.S. Cl. ....................... 710/33; 709/206; 358/473; 345/1.1
(58) Field of Search ........................... 710/33; 709/206; 358/473; 345/1.1

(56) References Cited

U.S. PATENT DOCUMENTS

| | | | | |
|---|---|---|---|---|
| 5,200,991 A | * | 4/1993 | Motoyanagi | ................ 455/465 |
| 5,793,416 A | * | 8/1998 | Rostoker et al. | ......... 348/14.13 |
| 6,038,295 A | * | 3/2000 | Mattes | .................... 379/93.25 |
| 6,072,595 A | | 6/2000 | Yoshiura et al. | |
| 6,421,707 B1 | * | 7/2002 | Miller et al. | ................. 709/206 |
| 6,489,934 B1 | * | 12/2002 | Klausner | ..................... 345/1.1 |
| 6,628,430 B1 | * | 9/2003 | Silverbrook et al. | ........ 358/473 |

FOREIGN PATENT DOCUMENTS

| | | |
|---|---|---|
| JP | 08-097854 | 4/1996 |
| JP | 09-270857 | 10/1997 |
| JP | 10-191453 | 7/1998 |
| JP | 11-146118 | 5/1999 |
| JP | 11-161457 | 6/1999 |
| JP | 11-167534 | 6/1999 |
| JP | 2000-278312 | 10/2000 |

* cited by examiner

Primary Examiner—A. Elamin
(74) Attorney, Agent, or Firm—David G. Conlin; William J. Daley, Jr.; Edwards & Angell, LLP

(57) ABSTRACT

A mail server includes a forwarding confirmation section which notifies a mobile phone of receipt of an e-mail, and mail and address forwarding sections which send attached data separated and a user ID to a print server, respectively. Each printer is managed by the print server that includes data holding and stored data search sections for storing the attached data and user ID. The printer has an input section from which the user ID is inputted. The print server is notified of the user ID inputted from the printer so as to search for attached data corresponding to the notified user ID and transfer it to the printer for print. It is thus possible to provide a print service system capable of printing out attached data when not recognized by some mobile devices including a mobile phone, by a nearest printer connected with a broadband network, without increasing communications costs.

49 Claims, 15 Drawing Sheets

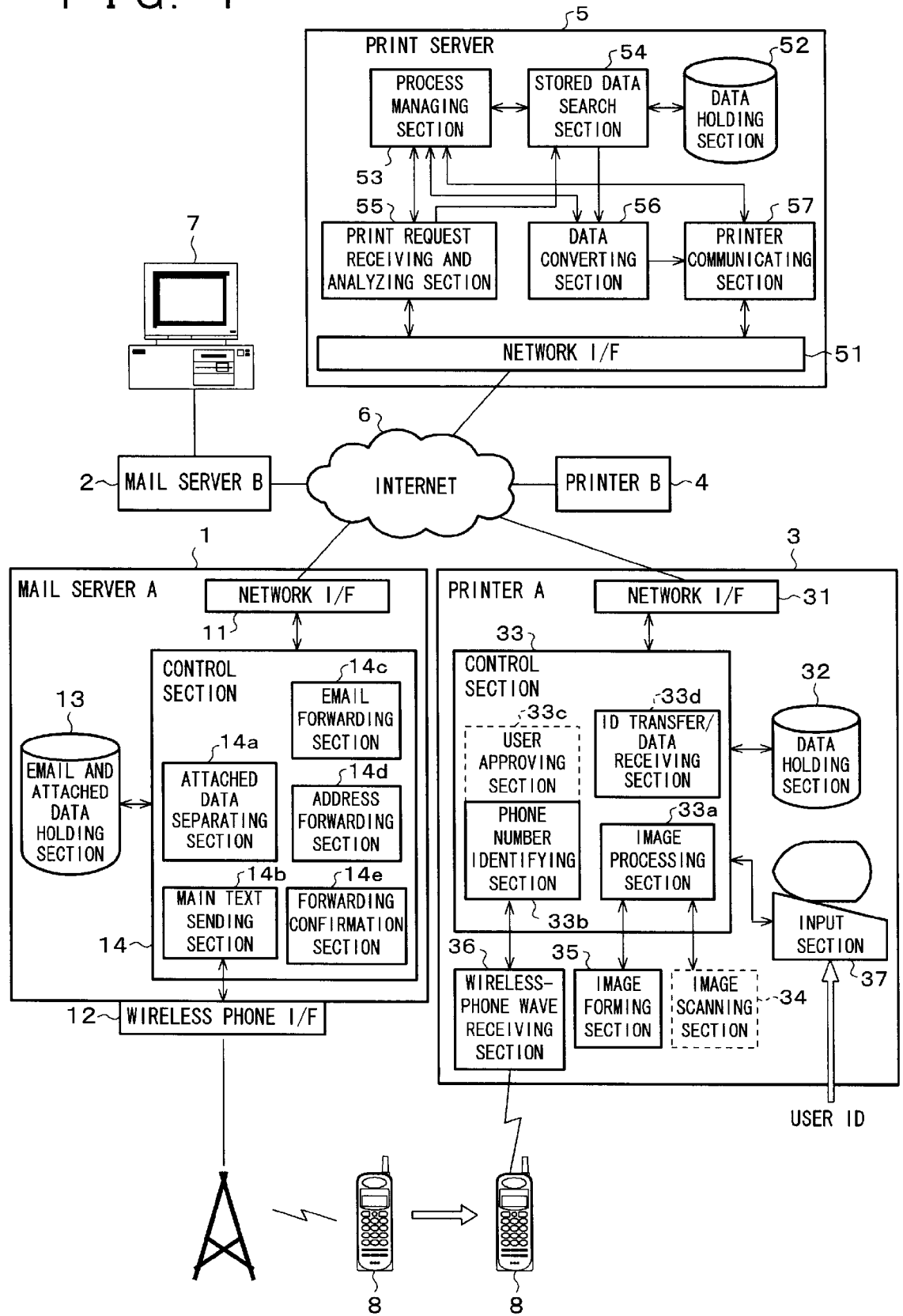

FIG. 6

```
USER ID : 0 9 0 - 2 2 2 2 - 3 3 3 3

◎  0 0 1 2 3 4 5 6 7 7    BLOCK DIAGRAM OF ■■■
    STORAGE EXPIRATION TIME   1 5 : 3 0
◎  [0̷0̷1̷2̷3̷4̷5̷7̷1̷1̷]    TABLE OF THE TOTAL OF ◇◇◇
    STORAGE EXPIRATION TIME   1 6 : 0 0
    . . . . . . . . . . . .
```

↑
↓
OK
DEL

F I G. 1 4
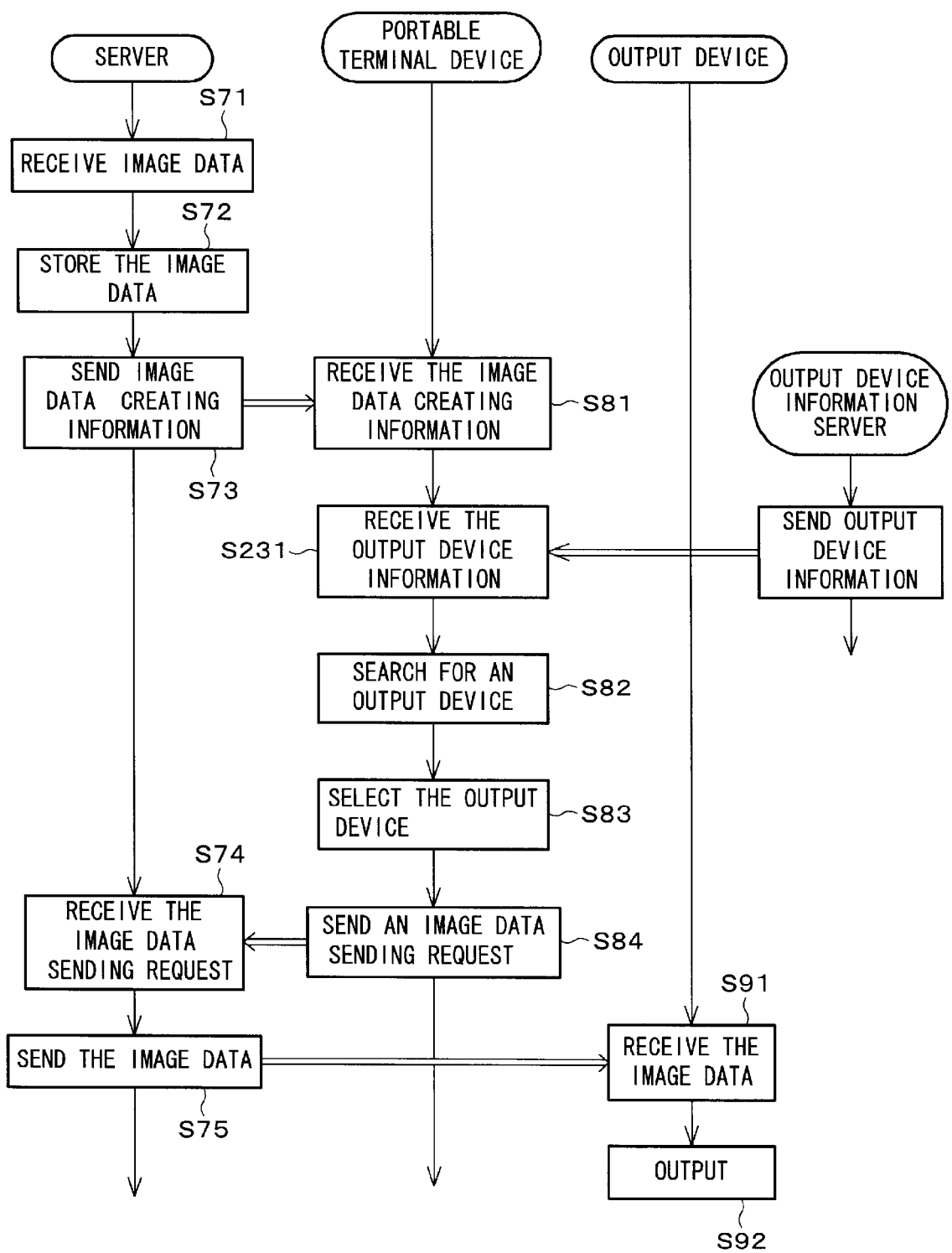

F I G. 1 5
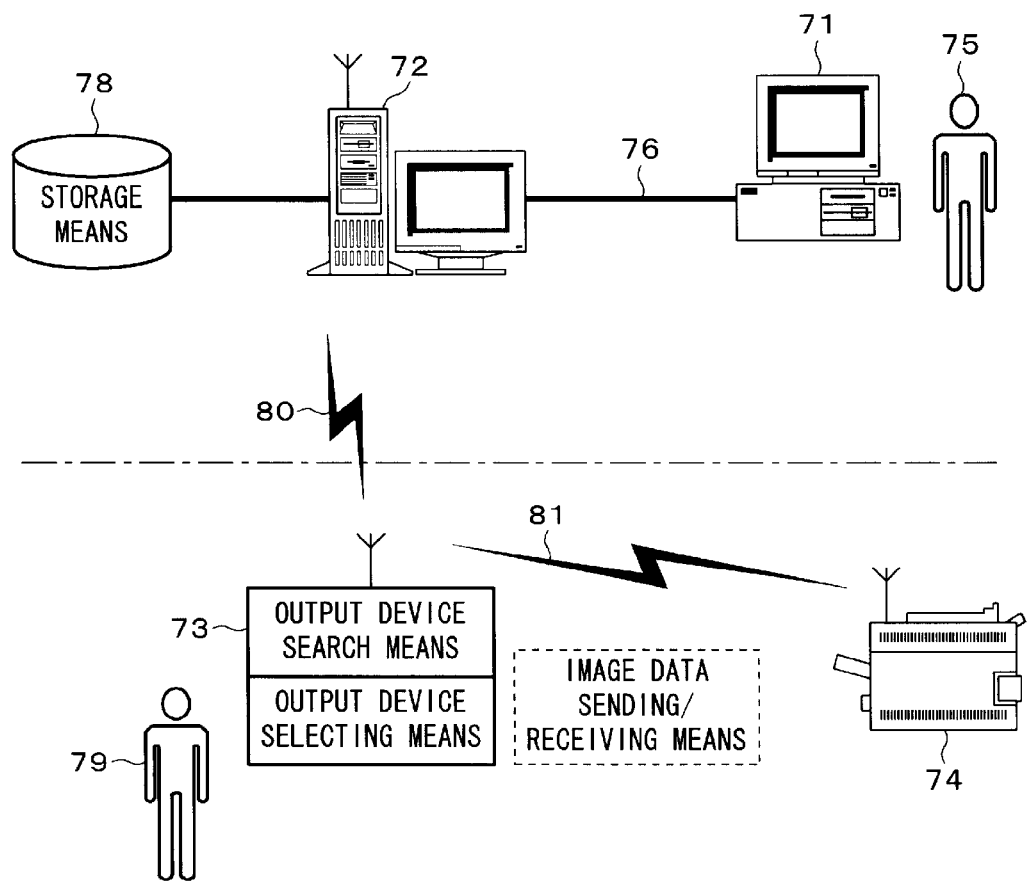

DATA OUTPUT SYSTEM, MOBILE TERMINAL, DATA OUTPUT METHOD, DATA OUTPUT PROGRAM, AND COMPUTER-READABLE RECORDING MEDIUM STORING DATA OUTPUT PROGRAM

FIELD OF THE INVENTION

The present invention relates to a data output system, a mobile terminal, a data output method, a data output program, and a computer-readable recording medium storing the data output program, that are used to print out attached data of an e-mail in the case where, for example, an e-mail containing the attached data is transmitted to a mobile device, such as a mobile phone, a simple mobile phone (PHS: Personal Handyphone System; a registered trademark) or a portable information terminal (PDA: Personal Data Assistant), but the attached data is of a kind that cannot be displayed by the mobile device.

BACKGROUND OF THE INVENTION

In recent years, sending and receiving e-mails via the Internet is one major information service that a wireless phone, such as a mobile phone, a PHS (simple mobile phone) or the like can provide as with a personal computer.

This is realized by a system in which a mail server is provided in a network center, and the mail server is set to receive an e-mail which has been directed to each wireless phone via the Internet on behalf of the addressee. Thereafter, the received e-mail is converted to mail data in the format unique to the system, and the mail data is transmitted to the phone.

Meanwhile, an e-mail essentially has a function to send document data, graphic data, etc., which were created using, for example, application software of the personal computer, by attaching them to text data as being the main body. This function has been widely utilized among personal computers.

On the other hand, the mailing system for a wireless phone has problems such that (i) attached data contained in an e-mail, except for those in the format unique to the wireless phone system, cannot be converted to mail data recognizable by the phone, and (ii) the wireless phone does not have an ability to manipulate the attached data.

Therefore, it is conventionally set that the mail server deletes the attached data before forwarding an e-mail to the wireless phone.

However, in order to save such attached data from deletion, an e-mail transfer device disclosed in Japanese Unexamined Patent Publication No. 167534/1999 (Tokukaihei 11-167534 published on Jun. 22, 1999) has a system for printing attached data at the mail server.

In addition, Japanese Unexamined Patent Publication No. 161457/1999 (Tokukaihei 11-161457 published on Jun. 18, 1999) discloses an information output device having a system in which a terminal device, when receiving an e-mail containing attached data that cannot be recognized by a phone, forwards the e-mail to a special printer capable of manipulating the attached data.

Nevertheless, the conventional print service system of the above publication 11-167534 has a problem that an addressee should actually fetch the printed document from the place where the mail server is located.

Likewise, the print service system of the above publication 11-161457 has such a problem that, because the whole e-mail is sent to the terminal device that can recognize the attached data, it unnecessarily increases communicating operation, thereby increasing communication costs. In addition, as in the case of printing at the mail server, an addressee should fetch the printed document from the place holding the forwarded e-mail.

Meanwhile, in recent years, the downsizing of terminal devices and the development of wireless communications technology have triggered the spread of a portable terminal device having a wireless communications mode. This enables its users to obtain and send data somewhere away from the home.

On the other hand, when one attempts to output such data as image data by printing for example, the portable terminal device is not provided with a print mode, or in many cases, there exist no such image forming devices as printers around, thus preventing output of the image data.

Accordingly, in order to solve the foregoing problems, for example, Japanese Unexamined Patent Publication No. 146118/1999 (Tokukaihei 11-146118 published on May 28, 1999) proposes a data processing system capable of receiving print service which utilizes the portable terminal device in a place where an image forming device is provided. More specifically, the data processing system enables communication among a server having a recording medium, the portable terminal device and the image forming device via a predetermined communication medium, and provides a user with print service as follows: first, user information from the portable terminal device is registered on the recording medium to be connected to the server while approving the user by referring to the registered user information, or print data from the portable terminal device is directed via the server to the image forming device registered in advance, then an approval of the user, who has come to the image forming device, is performed to check whether the user is the registered one or not; thereafter, based on the user's print data output request, control is performed to read the registered print data out of the recording medium of either the server or the image forming device, and charge such readout process, thus allowing the user to make use of a pay print service utilizing the portable terminal device at an arbitrary place where the image forming device is provided.

However, in the case of the data processing system, when a user in the office needs to send image data to a user outside the office, the user outside the office may not always have easy access to the image forming device designated in advance as the output terminal in terms of the distance. Thus, the problem is that the user outside the office is often required to come all the way to the designated place, that actually makes it difficult to readily obtain the resultant print. Moreover, there is another problem that it is difficult to output image data should there be no constant connection between the image forming device and the server over the communications line.

SUMMARY OF THE INVENTION

It is an object of the present invention to provide a data output system, a mobile terminal, a data output method, a data output program and a computer-readable recording medium storing the data output program, that enable printing of such attached data that cannot be recognized by some mobile devices, such as a mobile phone, by the nearest printer whereby broadband network connection is available, without increasing communication costs.

Another object of the present invention is to provide a data output system, a mobile terminal, a data output method, a data output program and a computer readable recording medium storing the data output program, that, when image data which should be printed emerges, enable a user carrying a portable terminal device with him/her to obtain a print of the image data as required by printing the image data at a place designated by the user.

In order to attain the foregoing object, a data output system according to the present invention includes: a data providing section for specifying data; and a data output section including a mobile terminal which the data providing section notifies of data information that is unique to the data specified by the data providing section, and at least one output device including a specified output device which receives the data specified by the data providing section from the data providing section so as to output it.

Further, in order to attain the foregoing object, a mobile terminal according to the present invention, which is adopted in a data output system, includes a data providing section for specifying data and a specified output device for receiving the data specified by the data providing section from the data providing section so as to output it, the mobile terminal being notified by the data providing section of data information which is unique to the data specified by the data providing section.

Further, in order to attain the foregoing object, a data output method according to the present invention includes the steps of: notifying data information from a data providing section for specifying data to a mobile terminal, the data information being unique to the data specified by the data providing section; sending the data specified by the data providing section from the data providing section to a specified output device which is selected from at least one output device; and outputting the data sent from the data providing section by the specified output device.

Further, in order to attain the foregoing object, a data output program to be executed by a computer includes the steps of: notifying data information from a data providing section for specifying data to a mobile terminal, the data information being unique to the data specified by the data providing section; sending the data specified by the data providing section to a specified output device which is selected from at least one output device; and outputting the data sent from the data providing section by the specified output device.

Further, in order to attain the foregoing object, a computer-readable recording medium stores a data output program to be executed by a computer, the program including the steps of: notifying data information from a data providing section for specifying data to a mobile terminal, the data information being unique to the data specified by the data providing section; sending the data specified by the data providing section to a specified output device which is selected from at least one output device; and outputting the data sent from the data providing section by the specified output device.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 1 is an overall view schematically showing one embodiment of a print service system according to the present invention.

FIG. 5(a) shows a list of phone numbers transmitted with the attached data from the mail server, FIG. 5(b) shows a list of data ID numbers of the attached data transmitted from the mail server, and FIG. 5(c) shows a state in which a data ID number is specified based on the phone number transmitted from the printer and in which attached data corresponding to the phone number is retrieved according to the thus specified data ID number.

FIG. 6 is an explanatory view showing the data ID number, name and storage expiration time of the attached data which are displayed on the printer in the presence of the attached data corresponding to the phone number.

FIG. 14 is a flow chart showing data output processes utilizing an output device information server.

FIG. 15 is an explanatory view showing a second data output method for the data output system.

DESCRIPTION OF THE EMBODIMENTS

Figure 2:
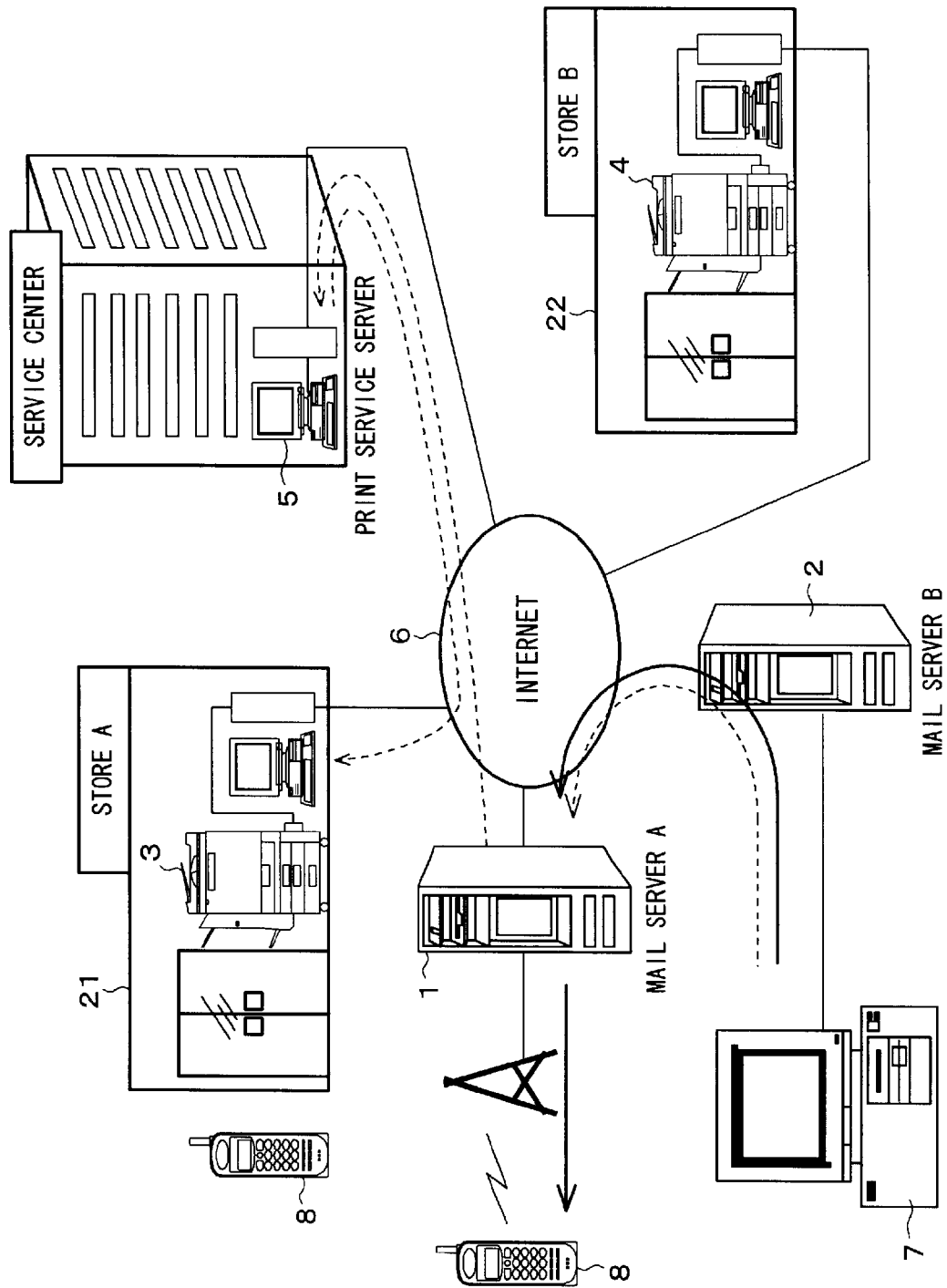
FIG. 2 is an explanatory view showing a relationship of connection among a print server, printers, mail servers and a mobile phone which are connected to the print service system.
Figure 3:
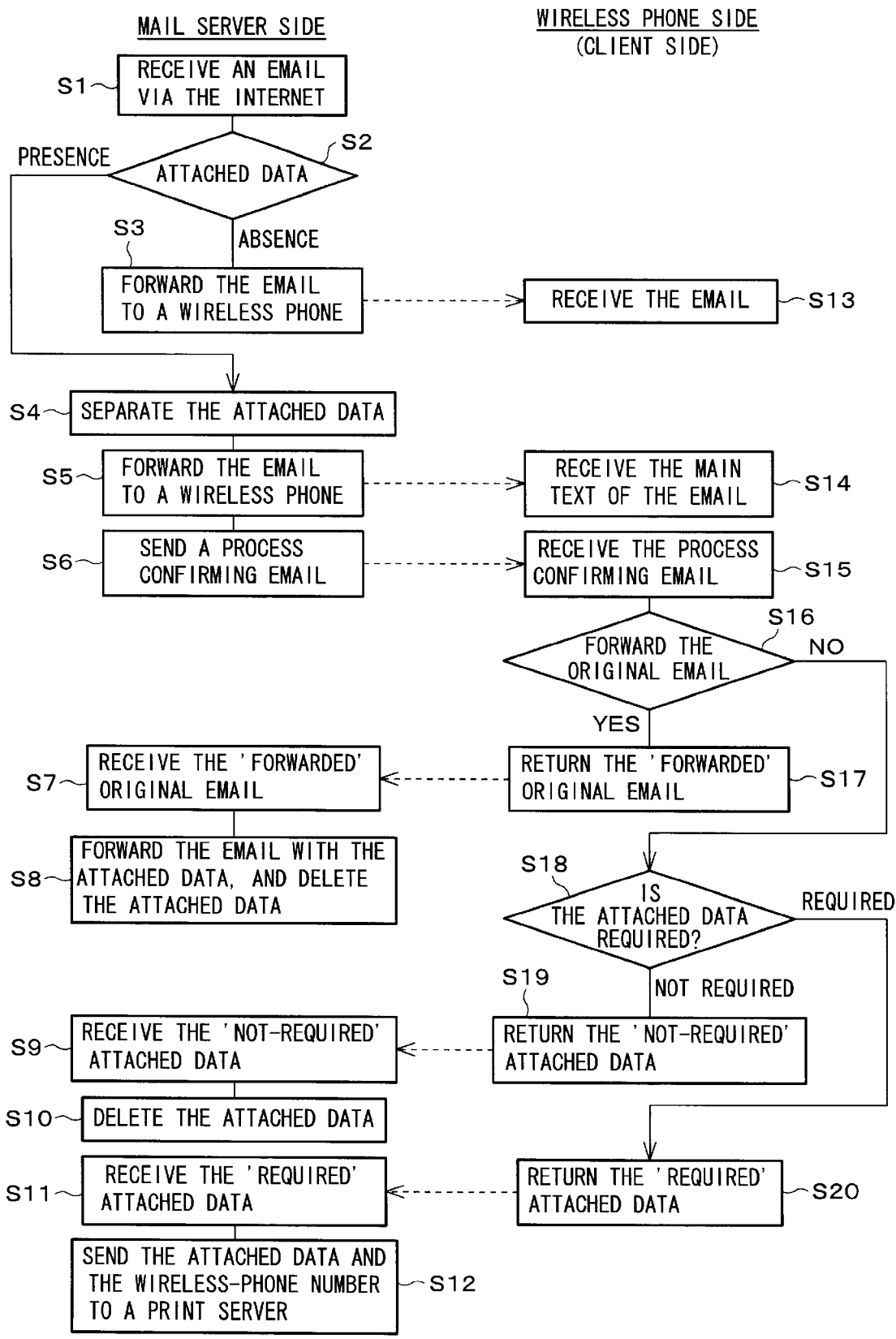
FIG. 3 is a comparative flow chart of the flow of processes respectively performed by a mail server and a mobile phone (wireless phone) in the case where an e-mail is sent to the mobile phone.

The following will explain one embodiment of the present invention with reference to FIGS. 1 to 7. Note that, in a print service system of the present embodiment, a mobile phone will be explained as a wireless phone. However, the wireless phone adopted in the system of the present invention is not necessarily limited to this, and is applicable to any of mobile devices including, for example, a mobile phone, a simple mobile phone (PHS: Personal Handyphone System), a portable information terminal (PDA: Personal Data Assistant) and others.

The print service system according to the present embodiment, as shown in FIG. 1, has an arrangement in which a mail server 1, printers 3 and 4 as print devices and a print server 5 are connected to the Internet 6 as a broadband network. Note that, the drawing also shows a mail server 2 pertaining to a different system and a personal computer (PC) 7 connected to the mail server 2. Note that, the printers 3 and 4 here refer to print devices respectively located in two different places. However, the number of printers is not limited to this, and it is assumed that other printers are also provided in a plurality of different places in addition to the printers 3 and 4.

The mail server 1 is a mail server A for mobile phones. As shown in FIG. 1, the mail server 1 includes a network interface (hereinafter referred to as "network I/F") 11, a wireless phone interface (hereinafter referred to as "wireless phone I/F") 12, an e-mail and attached data holding section 13, and a control section 14.

In the mail server 1, it is arranged that the control section 14 receives, on behalf of an addressee (each mobile phone 8), an e-mail which has been sent from a terminal of a different mailing system to a single mobile phone 8, which is a wireless phone, via the Internet 6 and the network I/F 11 in between. Further, the control section 14 is set so that a main text sending section 14b sends the text data of the e-mail (the main body of the e-mail) to the single mobile phone 8.

Meanwhile, in the case of sending an e-mail from the mobile phone 8, it is arranged that the wireless phone I/F 12 of the mail server 1 receives the e-mail sent from the mobile phone 8, then, the mail server 1 converts the format of the received e-mail to the format of an Internet mail, thereafter sending the converted e-mail to the destination via the network I/F.

Further, when the sent e-mail contains attached data, the control section 14 controls an attached data separating section 14a which is an attached data separation ID transmitting means to separate the attached data from the e-mail so as to temporarily store the attached data thus separated in the e-mail and attached data holding section 13.

Furthermore, the control section 14 controls a forwarding confirmation section 14e which is a receipt acknowledging means and a confirming means to notify the mobile phone 8 (N.B., FIG. 1 depicts two mobile phones 8 so as to indicate that the single mobile phone 8 is moved to a place closer to the printer 3; the same applies to FIG. 2 below) of the presence of the attached data in the e-mail. Here, at the same time, the forwarding confirmation section 14e inquires about a processing method so as to confirm a method for manipulating the attached data as explained below.

Further, it is arranged that an e-mail forwarding section 14c which is an attached data separation ID transmitting means and an address forwarding section 14d send the attached data to the print server 5 together with the phone number of the mobile phone 8 over the Internet 6.

The printers 3 and 4, as shown in FIG. 2, are respectively provided in such shops as a convenience store 21, copy shop 22 and the like, while being connected to a (broadband) network print system in alliance with them via the present print service system and the Internet 6 in between. Each of the printers 3 and 4 may be a digital combined machine which serves as both a facsimile machine and a copy machine.

The printers 3 and 4, as shown in FIG. 1, are connected to the Internet 6 via a network interface (hereinafter referred to as "network I/F") 31, and have a mode to print out the print data of the attached data transmitted from the print server 5.

In addition, the printers 3 and 4 can temporarily store the print data transmitted over the Internet 6 in a data holding section 32.

Furthermore, each of the printers 3 and 4, as shown in FIG. 1, has a copy mode to scan a document image and print it on a sheet by an image processing section 33a, an image scanning section 34 and an image forming section 35 of a control section 33.

Further, each of the printers 3 and 4 has an input section 37 which is an ID input means used for the input of a user ID when a user utilizes the print service system.

Further, the control section 33 of each of the printers 3 and 4 has a phone number identifying section 33b and a user approving section 33c for identifying as a user ID a weak radio wave travelling from the mobile phone 8 and being received, or monitored, by a wireless-phone wave receiving section 36. Namely, these wireless-phone wave receiving section 36, the phone number identifying section 33b and the user approving section 33c function as the ID input means and phone number obtaining means of the present invention.

Further, it is arranged that the phone number identified as the user ID is transferred to the print server 5 by an ID transfer/data receiving section 33d which is a phone number notifying means.

Note that, with respect to the present print service system, in addition to the printers 3 and 4, a plurality of printers having the same modes as those of the printers 3 and 4 are connected via the Internet 6.

Next, the print server 5 includes a network interface (hereinafter referred to as "network I/F") 51, a data holding section 52 as a storage means, a process managing section 53, a stored data search section 54 as a search means, a print request receiving and analyzing section 55, a data converting section 56 as a converting means, and a printer communicating section 57.

In addition, the print server 5 is connected to the Internet 6 via the network I/F 51, and can store the attached data transmitted from the mail server 1 and the phone number used as the user ID in the data holding section 52.

The print server 5 has an arrangement in which the data converting section 56 converts the attached data to print data which can be printed out by either of the printers 3 and 4, thereby fulfilling print requests from the printers 3 and 4. Further, based on a result of analysis conducted by the print request receiving and analyzing section 55, the stored data search section 54 retrieves attached data stored in the data holding section 52. Thereafter, the data converting section 56 converts the retrieved attached data to print data in such a data format that enables print by, for example, the printer 3 that issued the print request. Then, the printer communicating section 57 transmits the obtained print data to the printer 3 that issued the print request.

The following will explain the operation of the present print service system having this arrangement. First of all, the flow of processes performed by the mail server 1 when an e-mail is sent to the mobile phone 8 via the Internet 6 will be explained with reference to the flow chart of FIG. 3.

First, the mail server 1 receives an e-mail via the Internet 6 (S1) and judges whether or not the received e-mail contains attached data (S2).

Next, in the absence of the attached data in the received e-mail, the mail server 1 sends the text data of the e-mail to the mobile phone 8 (S3), so that the mobile phone 8 receives the e-mail, thereby terminating the process (S13).

However, in the presence of the attached data in the e-mail, the mail server 1 separates the attached data from the e-mail and stores the separate attached data (S4), thereafter sending text data alone to the mobile phone 8 (S5, S14). Immediately after that, in order to confirm the presence of the attached data in the e-mail, and a processing method for the separated attached data, the mail server 1 sends a process confirming e-mail to the mobile phone 8 (S6).

The user of the mobile phone 8 receives the process confirming e-mail (S15). The user may select from the process confirming e-mail, most desirable processing from the group consisting: "forward the whole e-mail (the attached data and main body) to a desired terminal device (for example, a PC at home or in the office, or a PC 7 belonging to the mail server 2)", "delete the attached data", or "print out the attached data" (S16–S20).

Here, in step S16, when the user selects forwarding the whole e-mail and therefore returns a command "forward" (S17), the mail server 1 receives the command "forward" (S7), thereby forwarding the e-mail and attached data to either an address designated by the user or a predetermined address and deleting the attached data the mail server 1 stored (S8).

On the other hand, in step S18, when the user selects deletion of the attached data and therefore returns a command "not required" (S19), the mail server 1 receives the command "not required" (S9), thereby deleting the attached data in storage (S10).

Alternatively, in step S18, when the user selects printing the attached data and therefore returns a command "required" (S20), the mail server 1 receives the command "required" (S11), thereafter sending the attached data together with the phone number of the mobile phone 8 that serves as the user ID with respect to the print server 5 (S12).

Note that, in the above flow chart, in step S6, it is arranged that only the process confirming e-mail is sent to the mobile phone 8, though not limited to this. Namely, for example, the process confirming e-mail to be sent to the mobile phone 8 may include information on the printers 3 and 4 that are available for printing the attached data and located in the vicinity of the user, or information on the location of stores/shops respectively having the printers 3 and 4. It is preferable that the mail server 1 is set so that, according to the user's instruction, it can notify the mobile phone 8 of the respective locations of the printers 3 and 4 that are ready to print out the attached data.

Furthermore, in step S17 or S20, it may be arranged that the user can designate the printer 3 or 4 for use, when responding to the process confirming e-mail. In that case, the print server 5 sends in advance the attached data to either of the printers 3 and 4 designated, thereby augmenting the print rate of the printer 3 or 4.

Figure 4:
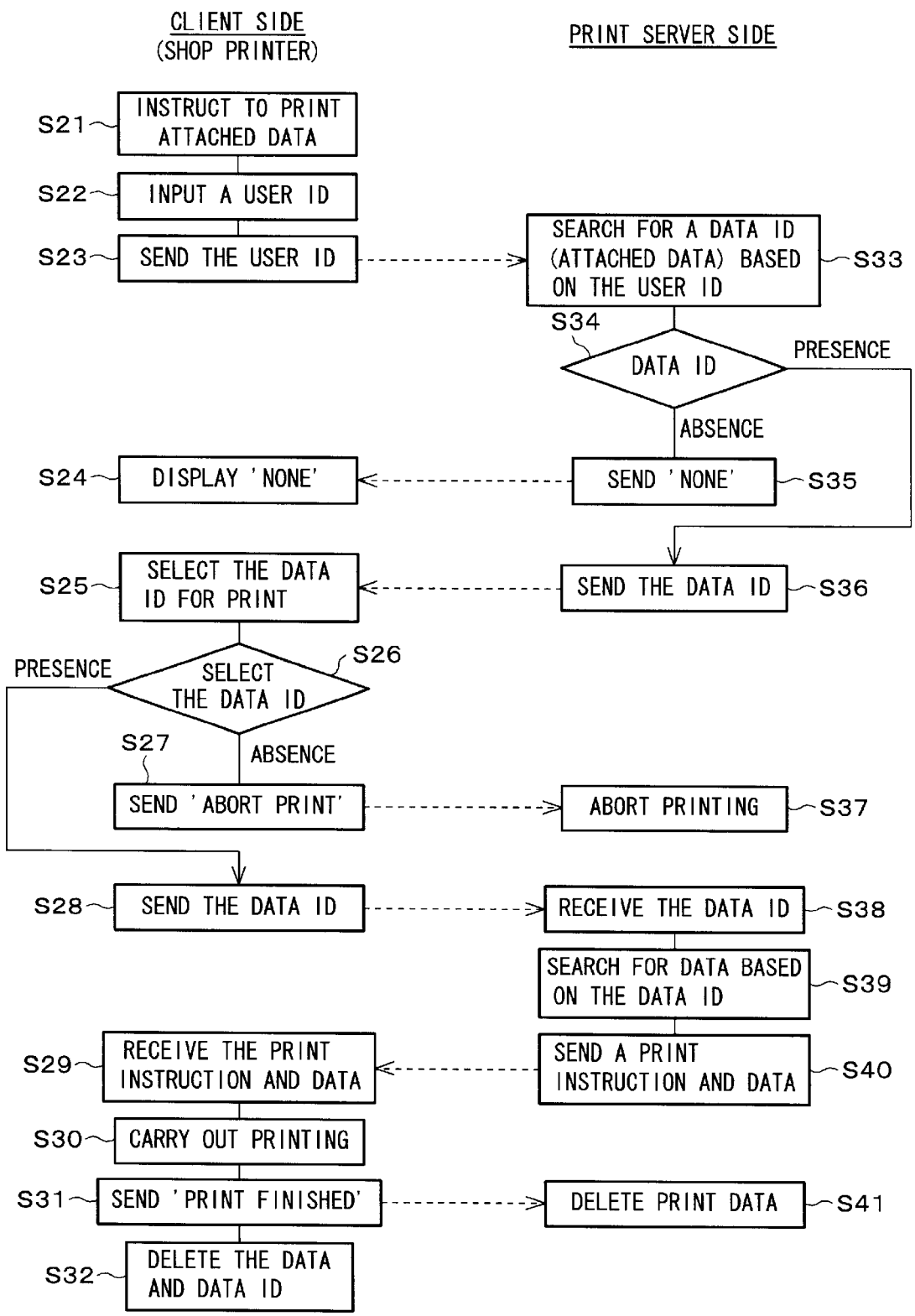
FIG. 4 is a comparative flow chart of operational processes respectively performed by a printer and a print server in the case where a user selects to print attached data.
Figure 5:
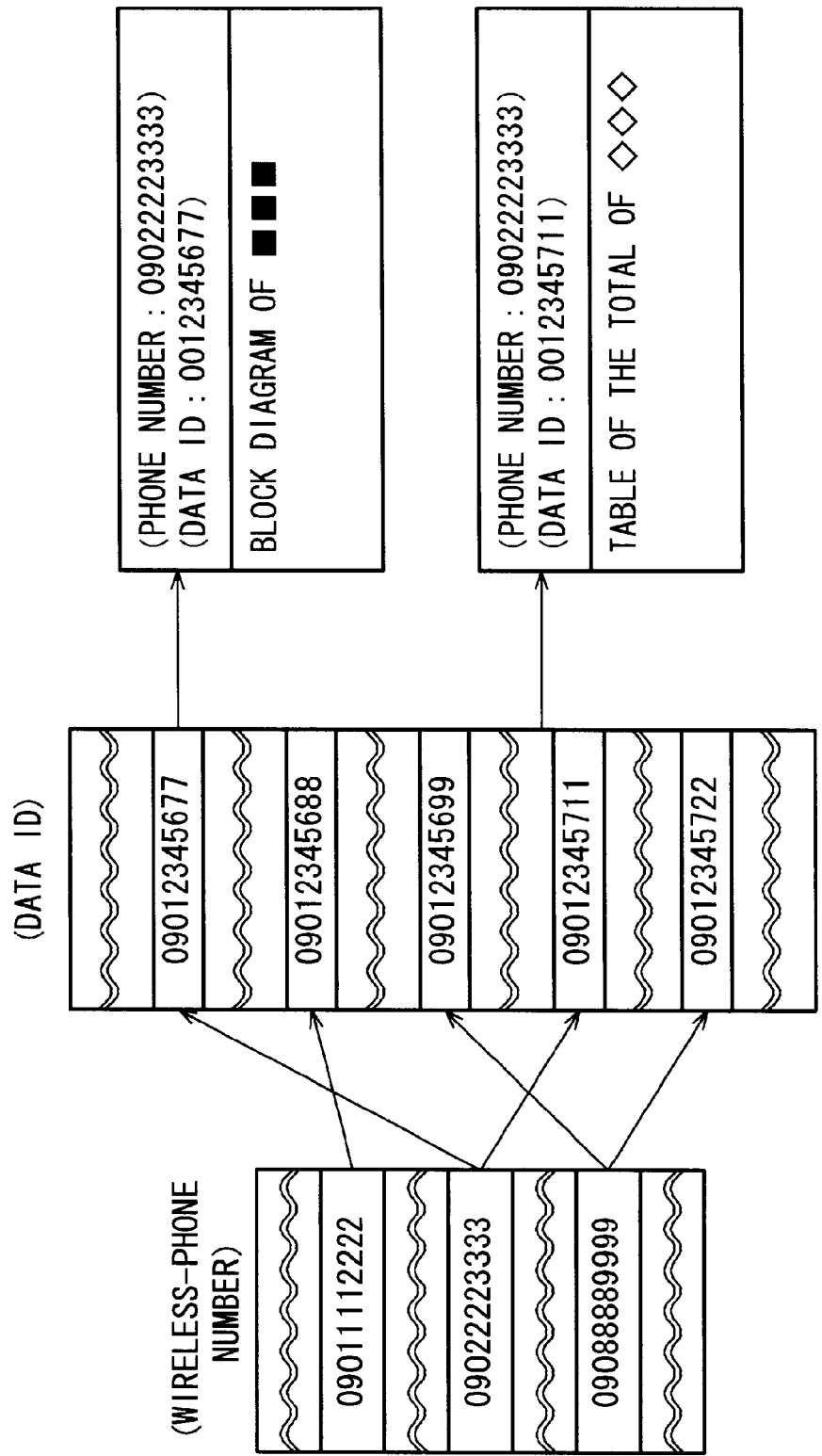
FIGS. 5(a) through 5(c) are explanatory views showing a method for controlling attached data employed by the print server, where

Next, the following will explain the operation of the print server 5 and the printers 3 and 4 when, in step S18, the user selects printing the attached data with reference to the flow chart of FIG. 4.

When selecting printing the attached data, the user visits the nearest shop having the printer 3 and printing out the attached data by the printer 3.

In that case, as shown in FIG. 4, the user instructs the printer 3 to print the attached data via the input section 37 that is the ID input means of the printer 3 (S21), while inputting the phone number as the user ID (S22). As to means for inputting the user ID, in the case where the user carries the mobile phone 8 with him/her, the mobile phone 8 sends radio waves. Therefore, it is possible to receive the wave thus sent by the wireless-phone wave receiving section 36 so as to use it as the user ID. Note that, operational processes here will be later described in detail.

Next, the printer 3 that has received the phone number as the user ID sends the number to the print server 5 (S23).

The following will explain the storage condition of the attached data in the print server 5.

First, the print server 5 attaches the predetermined data ID number to the attached data sent from the mail server 1. The data ID number is utilized for the management of the attached data.

Further, the print server 5 is set to manage the data ID number by matching it with the phone number of the mobile phone 8, that is, the user ID.

More specifically, the print server 5 creates and stores lists, one of which is the list of phone numbers sent from the mail server 1 together with the attached data as shown in FIG. 5(a), and the other is the list of the data ID numbers of the respective attached data as shown in FIG. 5(b). Further, as shown in FIG. 5(c), the print server 5 specifies the data ID number based on the phone number notified by the printer 3, and as shown in FIG. 4, searches for attached data corresponding to the phone number based on the specified data ID number (S33).

In the case of searching for the attached data corresponding to the phone number in step S33, the print server 5 judges the presence or absence of the data ID number (S34). Thereafter, in the absence of the data ID number corresponding to the phone number, that is, in the absence of the attached data, the print server 5 notifies the printer 3 of that fact (S35). The printer 3 thereby displays the fact of the absence of the attached data for print on a display screen (S24).

On the other hand, in step S34, in the presence of the data ID number corresponding to the phone number, that is, in the presence of the attached data, the print server 5 sends the data ID number, name and storage expiration time of the attached data to the printer 3 (S36). Here, the printer 3 is set, as shown in FIG. 6 for example, to display these items of information on the display screen.

Next, as shown in FIG. 4, the user selects the data ID number for print (S25). Here, should the user select to quit printing the attached data for the reason that he/she changed the mind, etc. (S26), the user either instructs the printer to abort printing or abandons data selection within the predetermined time, thereby notifying the printer 3 of the abortion of printing. The printer 3 thereby sends the instruction for the abortion of printing to the print server 5 (S27), thereby terminating the process (S37).

However, in step S26, in the case where the attached data for print is selected by the user, the printer 3 sends the data ID number of the selected attached data to the print server 5 (S28). The print server 5 thereby converts the received attached data corresponding to the data ID number to print data in such a format that enables print by the printer 3, thereafter sending the print data thus prepared and the print order to the printer 3 (S38, S39, S40).

Thereafter, the printer 3 prints out the attached data received from the print server 5 (S29, S30). Then, after reporting the print server 5 that the print is finished (S31), the printer 3 deletes the attached data, thereby terminating the process (S32). Further, the print server 5 thus reported of the completion of print deletes the attached data sent to the printer 3, thereby terminating the process (S41).

As explained, the present print service system has an arrangement that enables the user, even when receiving an e-mail containing attached data by the mobile phone 8, to print out the attached data by the printer 3 which is provided in the nearest shop and arranged into the (broadband) network print system in alliance therewith, and check the content of the attached data.

In addition, this allows the sender of an e-mail to send an e-mail with attached data without checking whether the receiving terminal is the mobile phone 8 or not.

Note that, in the present print service system, the print server 5 is provided with the data converting section 56, thereby making it possible to handle Internet fax data utilizing an image file in the TIFF format as well as data created by application software for PCs.

Meanwhile, from the mobile phone 8, in order to inform a base station of the location even during standby, weak radio waves containing the information of the phone number are always sent to the base station.

Therefore, the printer 3 may be arranged to catch the wave of the mobile phone 8 so as to obtain the phone number.

Figure 7:
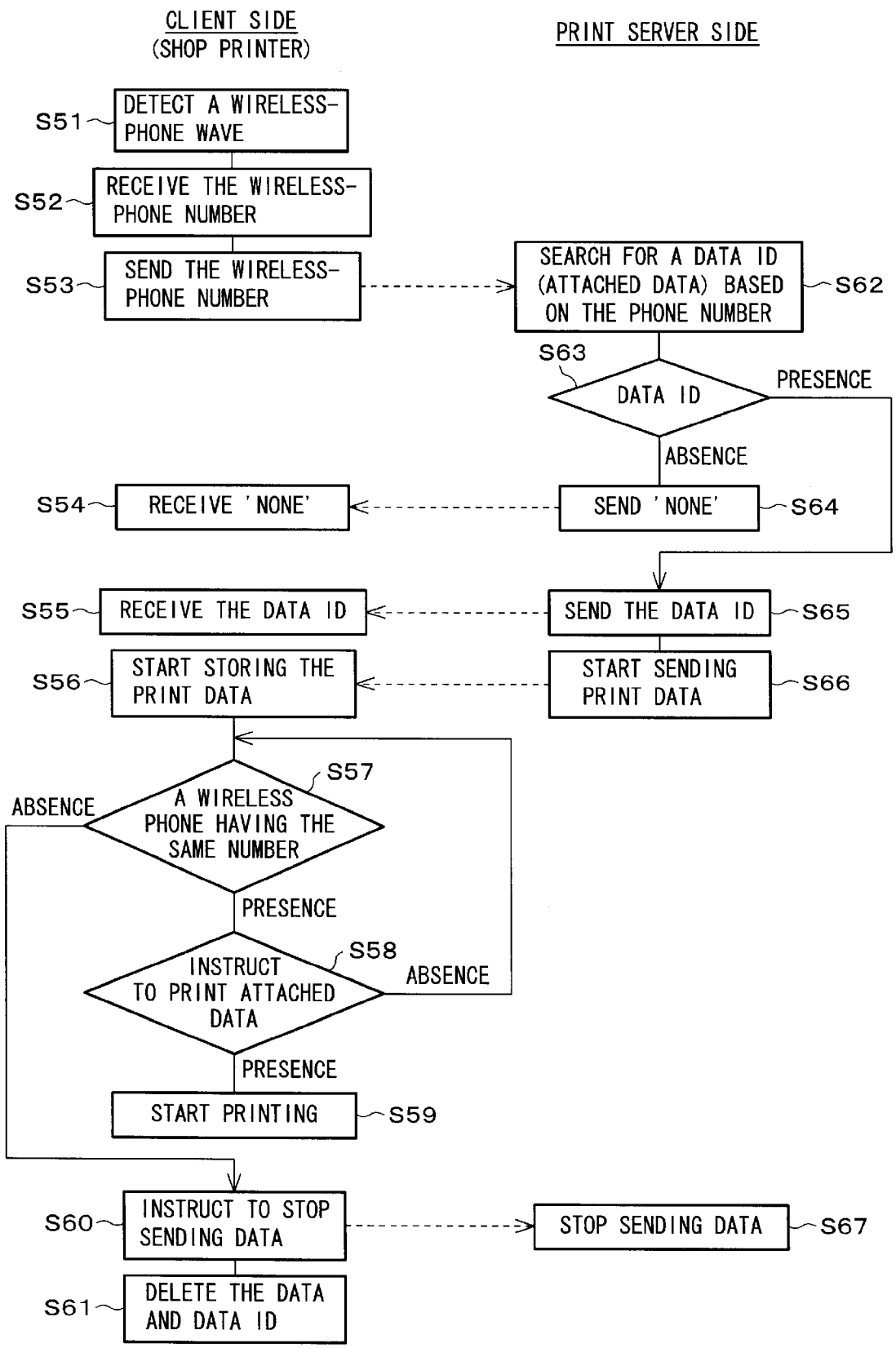
FIG. 7 is a comparative flow chart of the operational processes respectively performed by the printer and the print server in the case where the printer automatically obtains the phone number by catching a radio wave from the mobile phone.

In that case, by performing processes as shown in the flow chart of FIG. 7, time required before actually carrying out printing can be shortened.

Specifically, as shown in FIG. 7, the printer 3 first detects the wave of the mobile phone 8 as the user carrying the mobile phone 8 with him/her approaches it (S51). The printer 3 then isolates the phone number of the mobile phone 8 (S52) so as to send it to the print server 5 (S53).

This enables the print server 5 to search for the data ID number corresponding to the phone number (S62) so as to check the presence or absence of attached data (S63). Here, in the absence of the attached data, the print server 5 notifies the printer 3 of it (S64), and the printer 3 receives that fact of the absence of the attached data (S54). On the other hand, in the presence of the attached data, the print server 5 sends the retrieved data ID number to the printer 3 (S65) while converting the attached data corresponding to the data ID number to print data in such a format that enables print by the printer 3, thereby starting sending the print data (S66). The printer 3 thereby receives the data ID number (S55) and stores the print data of the attached data (S56). Note that, in the case where the printer 3 can print out the attached data in its unique data format, the print server 5 sends the attached data as it is as the print data, skipping conversion in the data converting section 56.

Next, as discussed, while receiving the wave of the mobile phone 8, namely, while the user carrying the mobile phone 8 with him/her is nearby, the printer 3 awaits the user's print instruction (S57, S58). When the print instruction is inputted, the printer 3 prints out the print data of the attached data that has already been received (S59).

However, in step S57, in the case where the receipt of the wave of the mobile phone 8 is prevented, that is, the user having the mobile phone 8 went away before the input of the print instruction, then the printer 3 instructs the print server 5 to abort transmission of the print data of the attached data (S60), while deleting the print data and data ID number of the attached data already received, thereby terminating the process (S60, S61). The print server 5 thereby stops sending the print data of the attached data (S67).

As explained, the print service system according to the present embodiment includes the plurality of printers 3, 4 and more connected with the Internet 6, the print server 5 for managing the respective printers 3, 4 and more connected with the Internet 6 via the Internet 6, and the mail server 1 which is connected with the Internet 6 and relays an e-mail directed to the mobile phone 8.

Accordingly, providing the plurality of printers 3, 4 and more on different sites in a scattered manner allows the user to simply fetch the printed document from the nearest place where the printer 3 or 4 is provided. Thus, there is no need to come all the way to the mail server 1 or a place to which an e-mail is forwarded, that is convenient.

Next, in the present embodiment, the mail server 1 includes the forwarding confirmation section 14e that is both the receipt acknowledging means and confirming means to notify the mobile phone 8 of the receipt of an e-mail containing attached data upon receipt thereof, the e-mail forwarding section 14c and the address forwarding section 14d that separates the attached data from the received e-mail so as to send the separate attached data and the user ID to the print server 5.

Accordingly, when receiving an e-mail containing attached data, the mail server 1 causes the forwarding confirmation section 14e to notify the mobile phone 8 of the receipt of the e-mail containing the attached data, thereby allowing the user owning the mobile phone 8 to become aware of the arrival of the e-mail with the attached data.

Meanwhile, the attached data separating section 14a of the mail server 1 separates the attached data from the received e-mail, and the mail forwarding section 14c and the address forwarding section 14d send the separate attached data and the user ID to the print server 5.

Here, the print server 5 is provided with the data holding section 52 which stores the attached data and the user ID by matching them. Therefore, when the attached data and the user ID are sent to the print server 5, the attached data is matched with the user ID and stored in the data holding section 52.

Next, each of the printers 3, 4 and more are provided with the input section 37 for inputting the user ID. This enables the user to input the user ID to the printer 3 selected from the plurality of printers 3, 4 and more.

In addition, when the user inputs the user ID to the printer 3 selected from the plurality of printers 3, 4 and more, the printer 3 notifies the print server 5 of it.

Based on this notification, the print server 5, which is provided with the stored data search section 54 for searching for attached data corresponding to the user ID, searches for the attached data corresponding to the notified user ID by the stored data search section 54, and forwards the retrieved attached data to the printer 3 to which the user ID has been inputted, thereby causing the printer 3 to print out the attached data.

As a result, even when receiving an e-mail containing attached data outside the office or home, the user can print out the attached data as required at the nearest place, that is, by the nearest printer 3.

Further, when printing, not the whole e-mail containing the attached data but the attached data alone can be sent to the printer 3 for print. This greatly saves transmission costs compared to the case where the main body of the e-mail is obtained by the mobile phone 8, thereafter sending the whole e-mail to the printer 3.

Consequently, it is possible to provide a print service system capable of printing attached data that cannot be recognized by such mobile devices as the mobile phone 8 and the like, by the nearest printer 3 connected with the Internet 6, without increasing transmission costs.

Further, in the print service system according to the present embodiment, the print server 5 includes the data converting section 56 for converting attached data to print data in such a format that enables print by the printer 3 that issued the print request.

Accordingly, in the case where the attached data is written in a special image format and cannot directly be printed by some of the printers 3, 4 and more, the data converting section 56 of the print server 5 converts the attached data to print data in the format that enables print by the printer 3 that issued the print request. Therefore, the printer 3 should not necessarily be of a high-grade model which can handle the special image format.

As a result, the attached data of an e-mail in any format can be printed by the nearest printer 3.

Further, in the print service system according to the present embodiment, the mail server 1 can match an e-mail address with the phone number of the mobile phone 8 that is the receiving terminal, as the user ID. In addition, the ID input means of the printer 3 is made up of the wireless-phone wave receiving section 36, the phone number identifying section 33b and the user approving section 33c whereby a wave sent from the approaching mobile phone 8 is received so as to obtain the phone number. The phone number thus obtained by the wireless-phone wave receiving section 36, the phone number identifying section 33b and the user approving section 33c is utilized as the user ID. Note that, the wireless-phone wave receiving section 36, the phone number identifying section 33b and the user approving section 33c are capable of obtaining the phone number of an ordinary wireless phone, such as the mobile phone 8, by catching a weak radio wave of the phone that is constantly sent so as to notify the location of the phone.

As a result, the user is required only to approach the printer 3 with the mobile phone 8 so as to cause the wireless-phone wave receiving section 36, the phone number identifying section 33b and the user approving section 33c of the printer 3 to obtain the phone number of the mobile phone 8 by catching the wave sent from the approaching mobile phone 8. Moreover, the phone number of the mobile phone 8 as the receiving terminal is utilized as the user ID in the mail server 1 by matching it with an e-mail address.

Accordingly, the user is not required to input the user ID directly to the input section 37 of the printer 3. Namely, the user ID that is the phone number can be inputted to the printer 3 simply by approaching the printer 3.

As a result, the user can skip inputting the user ID to the printer 3 so as to print out the attached data.

Thus, it is possible to provide a print service system having superior operability.

Further, in the print service system according to the present embodiment, the mail server 1 is provided with the forwarding confirmation section 14e that confirms a method for manipulating attached data with respect to the mobile phone 8.

Therefore, the mail server 1 can check by the forwarding confirmation section 14e what manipulation is required for the attached data by the user.

As a results, since the mail server 1 can ask the user whether the attached data should be printed, unnecessary printing can be prevented.

Further, in the print service system according to the present embodiment, each of the printers 3, 4 and more on one hand has the ID transfer/data receiving section 33d which notifies the print server 5 of the phone number obtained at the wireless-phone wave receiving section 36, the phone number identifying section 33b and the user approving section 33c, and the print server 5 on the other hand starts forwarding the attached data corresponding to the notified phone number.

Thus, the print server 5 is notified of the phone number obtained at the ID transfer/data receiving section 33d of the printer 3, thereby enabling the print server 5 to start forwarding the attached data corresponding to the notified phone number.

As a result, prior to the user's print instruction, the print server 5 can forward the attached data to the printer 3 in advance. Again, as explained, the user's approach to the printer 3 causes the print server 5 to forward attached data to the printer 3 in advance.

Consequently, when the user gives the print instruction, the printer 3 already received the forwarded attached data from the print server 5, thereby enabling the printer 3 to immediately start printing.

This allows the user to shorten standby time before printing actually starts.

The following will explain another embodiment according to the present invention with reference to FIGS. 8 to 16.

Figure 8:
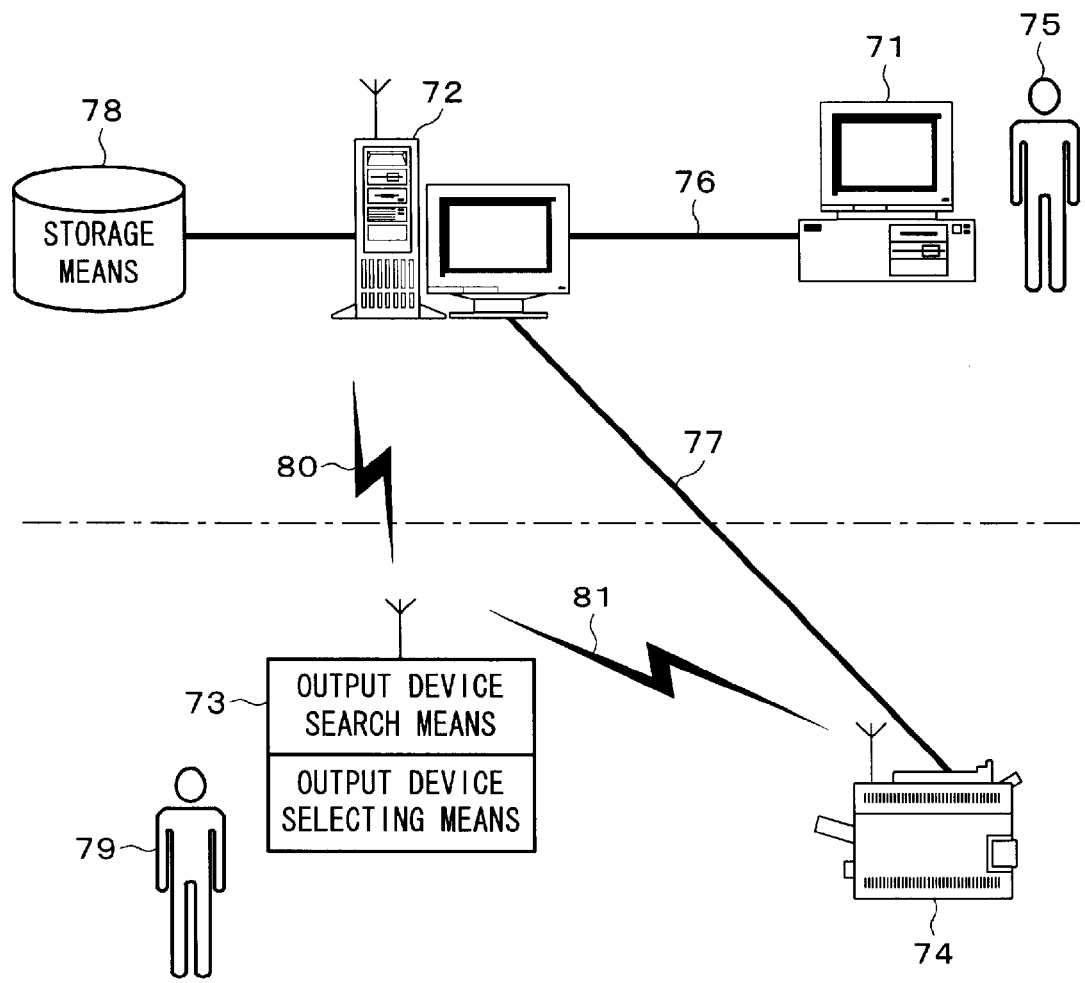
FIG. 8 is an explanatory view showing an arrangement of a data output system according to the present invention.

FIG. 8 shows a data output system according to the present embodiment. This system includes a client 71 who creates image data, a server 72, a portable terminal device 73, and a plurality of output devices 74 provided on different sites, all of which are connected via a network. The network utilized here is a wide area network (WAN) selected from the group consisting of such local area networks (LAN) as the Ethernet and optical communications, such public networks as a public communications line and a wireless communications line, and such private line networks as a high-speed digital line and the like. Either one of these networks is connected, as a communication medium, with the client 71, the server 72, the output devices 74 and the portable terminal device 73 so that they are mutually accessible, thereby performing internal data communication in accordance with a predetermined communication protocol.

The client 71 is such an OA device as a PC having a mode to create image data including a document created through operation by an operator 75 and a communications mode, that is connected to the server 72 via a communications line 76. The output device 74 is an image forming device having a print mode, such as a printer and a combined machine. The output device 74 also has a communications mode and is connected to the server 72 via a communications line 77. Note that, the output device 74 may be a display device having a display mode instead of a print mode. The server 72 is made up of a CPU (central processor unit), a ROM (read only memory), and a RAM (random access memory), and is provided with such storage means 78 as a magnetic and/or optical recording medium, thereby performing intensive management of various resources of the system, such as data. The portable terminal device 73 has a wireless communications mode, examples of which are a PDA (Personal Digital Assistant) and a laptop computer, which can be carried by a user 79 and is connected with the network via a wireless communications line 80. Therefore, the portable terminal device 73 is not constantly connected with the network but is temporarily connected with the network when receiving transmission from other devices, such as the server 72 and the like, or by spontaneous transmission. Note that, the portable terminal device 73 may alternatively be a mobile phone or a PHS (Personal Handyphone System) capable of data communication.

Further, the client 71 has a mode to send the created image data to the server 72 and a mode to send an identification code (terminal ID) of the portable terminal device 73 that is carried by the user 79 who intends to notify the server 72 of information on the creation of the image data ("image data creation information", hereinafter). The portable terminal device 73 has a mode to search for the output device 74 to be used to output image data when receiving the image data creation information according to a predetermined criteria, a mode to select one output device 74 out of a plurality of the output devices 74 detected by the search, a mode to send a request for outputting the image data to the server 72, and a mode to send an identification code (output ID) of the selected output device 74 to the server 72.

The server 72 has a mode to store the image data received from the client 71, a mode to notify the portable terminal device 73 designated by the client 71 of the image data creation information and an identification code (server ID) of the server 72 itself, and a mode to send the image data to the selected output device 74 when receiving the output request from the portable terminal device 73. The output device 74 has a mode to output the image data received from the server 72. Note that, as to a storage location of the image data, either the storage means 78 of the server 72 or any other file server is adequate.

Here, the above identification codes are e-mail addresses or phone numbers. Note that, there exist two or more of each of the clients 71, the portable terminal devices 73 and the output devices 74 over the network, and each of which is given its own identification code. In addition, the image data creation information includes information on an image, such as an identification code (image data ID) given to each image data, a server ID, resolution, color information, size, quantity, and the like.

In the case where the portable terminal device 73 is used to search for the output device 74, the detection of the desired output device 74 is performed according to information on the output device 74, such as its location and performance, and the image data creation information. This output device information is stored in such a recording medium as a memory within the portable terminal device 73, a removable memory card or the like. Alternatively, the output device information can be provided via the network from an external database in possession of that information. Such databases providing the output device information includes the output device 74. Note that, the database may be possessed by the server 72 or the client 71, in so far as it is capable of obtaining output device information. Moreover, a server other than the server 72, such as a print server monitoring the plurality of output devices 74 over the network, is also applicable here.

Figure 9:
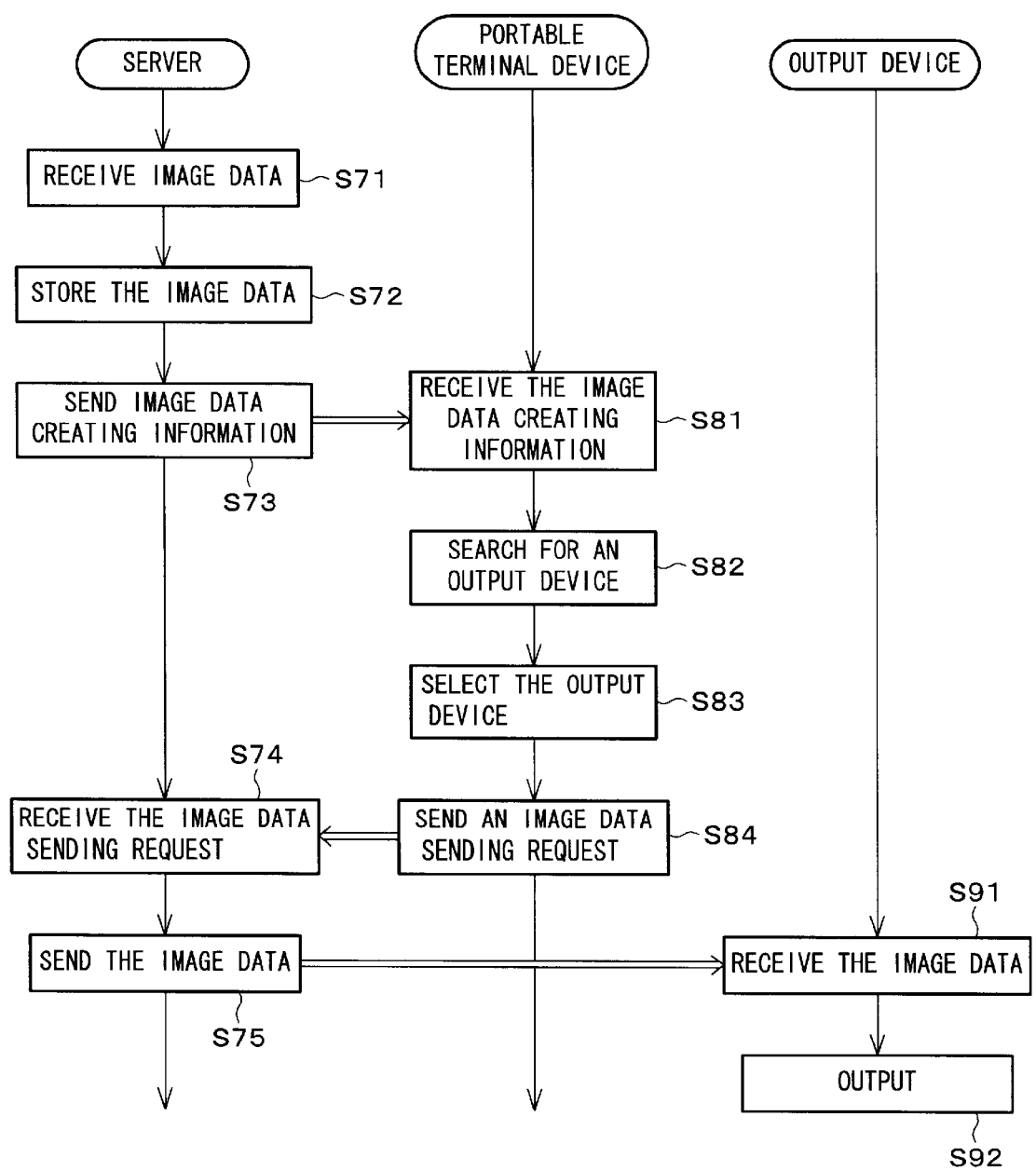
FIG. 9 is a flow chart showing a first data output method.

Next, a first data output method for the above system will be explained with reference to FIG. 9. First of all, the operator 75 operates the client 71 to create image data. When the client 71 sends image data creation information together with the image data to the server 72, the server 72 receives them (S71) and stores the image data in the storage means 78 (S72). Concurrently, the client 71 designates the user 79 who intends to send the image data so as to send the terminal ID of the portable terminal device 73 carried by the user 79 to the server 72. The server 72 sends the server ID together with the image data creation information to the portable terminal device 73 designated by the client 71 (S73), and the designated portable terminal device 73 receives the image data creation information (S81).

Here, when the server 72 receives the image data, it is also possible that only such notification information that the image data has been created is sent to the portable terminal device 73 so as to advise the user 79 that the image data has been created. The portable terminal device 73 draws the attention of the user 79 by, for example, producing a beeping sound indicating receipt or vibrating the device itself. This allows the user 79 of the portable terminal device 73 to learn without delay the presence of the image data that should be outputted. Thereafter, the portable terminal device 73 sends the server 72 a request for sending the image data creation information, thereby receiving the same information from the server 72.

The portable terminal device 73 searches for the output device 74 based on the received image data creation information and the output device information stored within the portable terminal device 73 (S82). When the search results show the presence of the output device 74 satisfying a predetermined condition, information thereof is displayed by a display of the portable terminal device 73. In that case, the user 79 may be notified of the search results showing the presence of the output device 74. The notification is given to the user 79 by, for example, producing a beeping sound or vibrating the device itself. By setting the notification in a different manner from the notification of the creation of image data, the user 79 can easily distinguish between them, thereby increasing convenience.

Figure 10:
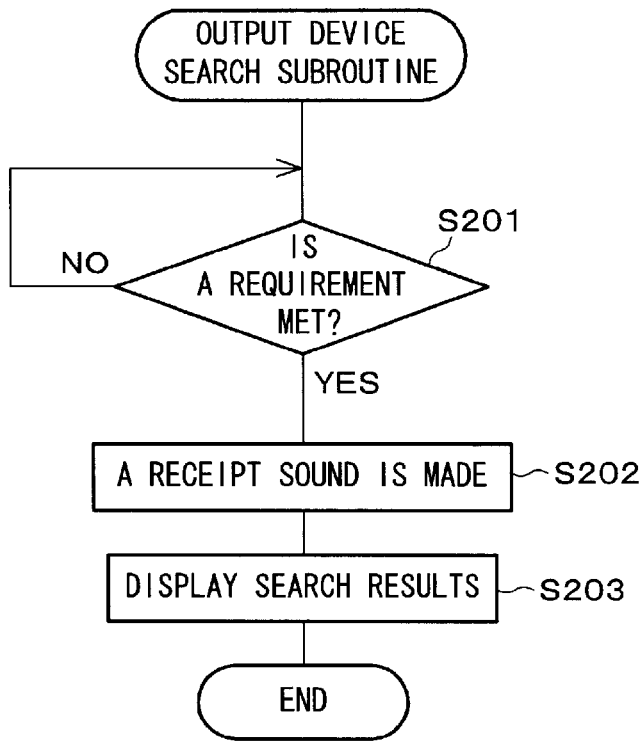
FIG. 10 is a flow chart showing output device detecting processes.

A condition of the search for the output device 74 is set so that, for example, the output device 74 sited in the vicinity of the portable terminal device 73 is detected. As shown in FIG. 10, searched for is the output device 74 which meets such a condition that it is sited within a predetermined range of the distance based on the current location information of the portable terminal device 73 and the respective location information of the output devices 74 (S201). When the desired output device 74 is detected, the user 79 is advised of the presence of the output device 74 by, for example, a beeping sound indicative of receipt ("receipt sound", hereinafter) (S202).

Here, in order to obtain the current location information of the portable terminal device 73, a GPS (Global Positioning System) device is mounted on the portable terminal device 73 so as to calculate the current location, or a location information signal is received from the base station that receives a radio wave transmitted from the portable terminal device 73, thereby grasping the current location.

Figure 11:
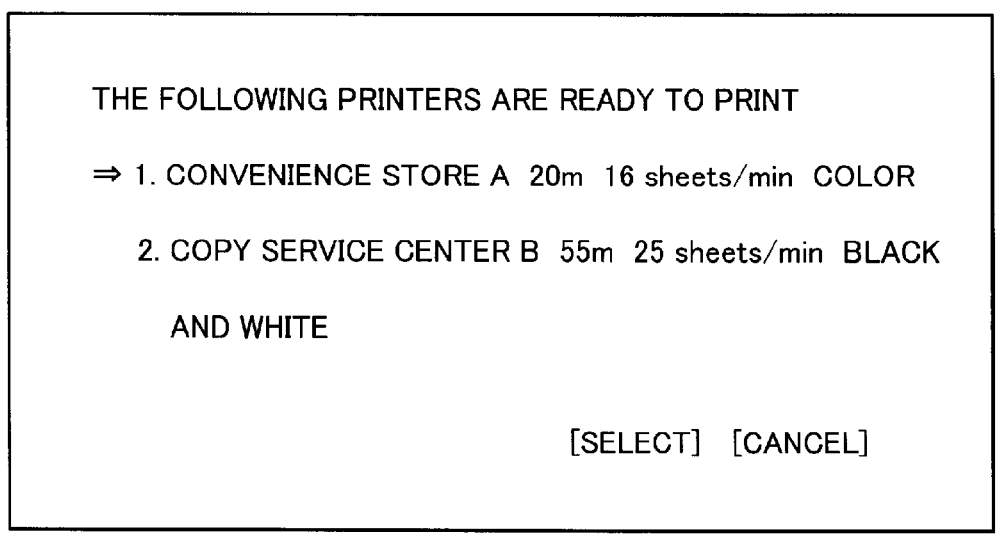
FIG. 11 is an explanatory view showing a display sample of output device search results.

Thereafter, as shown in FIG. 11, the detected output device 74 is displayed by the display (S203). The content of display of the search results includes the following information: the output device 74 listed on the top is sited 20 m apart and can produce 16 prints per minute in color, and the output device 74 listed next is sited 55 m apart and can produce 25 prints per minute in black and white. In that case, it is recommended that the search results are displayed in a descending sequence in accordance with the condition set, from the one with the highest hit rate to those with a lower hit rate. It is also recommended that output device information is additionally displayed, or when one of the displayed output devices 74 is selected, detailed information of the selected output device 74 is displayed.

Figure 12:
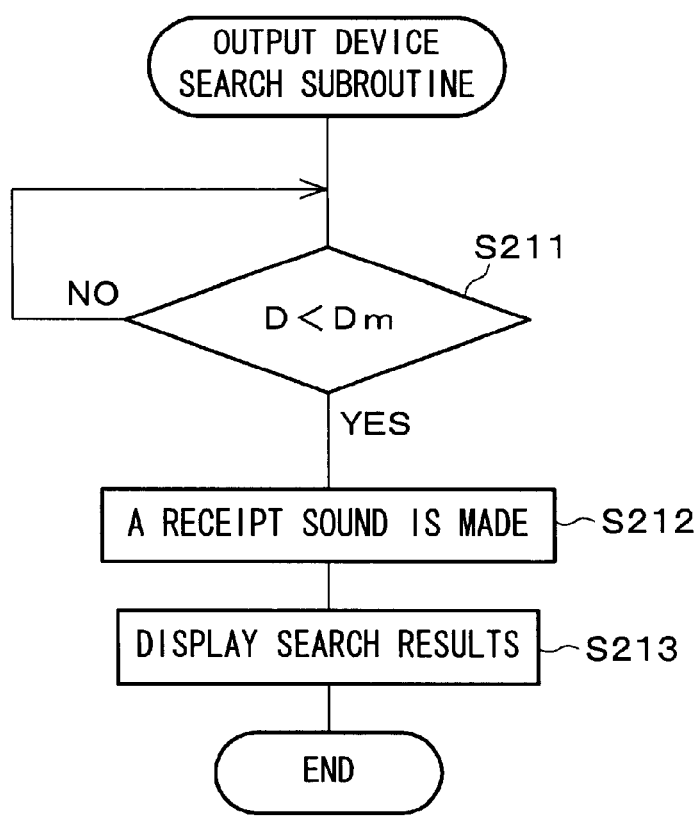
FIG. 12 is a flow chart showing output device detecting processes.

Further, it is also possible that a search condition is set in detail so that notification is given when the desired output device 74 meeting the condition is detected. More specifically, a search is performed to learn whether the distance between the portable terminal device 73 and the output device 74 is within a predetermined range, for example, whether the output device 74 exists within 100 m from the portable terminal device 73, and if there is one the notification is given. As shown in FIG. 12, D is the current distance between the portable terminal device 73 and the output device 74, and Dm is the distance at which or less the notification is given with respect to the user 79. A comparison is made to check if the distance D between the portable terminal device 73 and the output device 74 is not more than Dm (S211), and when D<Dm, notification is given with respect to the user 79 (S212), and the detected output device 74 is displayed (S213).

Next, an optimum output device 74 is selected from the detected output devices 74 (S83). As to criteria for the selection, the user 79 arbitrarily selects one, or the output device 74 with the highest hit rate with respect to the set condition is automatically selected. Should it be the case where the user wishes to change the automatically selected output device 74 to the different one, the user 79 only needs operation to select the different output device 74. On the other hand, when the user 79 is satisfied with the selected output device 74, it is confirmed, thereafter sending the server 72 an image data sending request for outputting the image data and the output ID of the thus selected output device 74 (S84).

The server 72, upon receipt of the output request from the portable terminal device 73 (S74), reads the desired image data out of the storage means 78 according to the image data ID and sends the image data to the selected output device 74 in accordance with the output ID (S75). Here, when direct connection between the server 72 and the output device 74 via a communications line 77 is available, the image data can be sent at high velocity. The output device 74, upon receipt of the image data (S91), outputs the image data according to a predetermined print condition, thus carrying out printing (S92). This enables the user 79 to receive the printed image data as soon as he/she reaches the selected output device 74.

Meanwhile, in the portable terminal device 73, when a condition on which the output device 74 is searched for is set, necessary output device information is stored in such storage means as the RAM, an EEPROM (Electrically Erasable Programmable ROM) and a flash memory of the portable terminal device 73. The output device information includes: the location of the output device 74, the performance of the output device 74 (color print or black and white print, double-sided print or single-sided print, the presence or absence of a zoom in/out print mode, the presence or absence of a stapler mode, the presence or absence of a sorting mode, and the presence or absence of such modes as paper size selection, paper type selection, print rate selection, resolution selection, print density level section, two-in-one, and four-in-one modes), the current status of the output device 74 (currently occupied or not, the number of standby jobs, a remaining quantity of toner, occurrence or non-occurrence of paper jam, a remaining quantity of paper in a paper tray, occurrence or non-occurrence of erroneous service, etc.), the data forwarding performance of communications means (a contact-free system utilizing wireless or optical communications, a USB (Universal Serial Bus), the Ethernet, other wired systems including a private connection system, etc.), service providers (a convenience store, a printing service provider, etc.), charges, or an index obtained by combining all of these.

Figure 13:
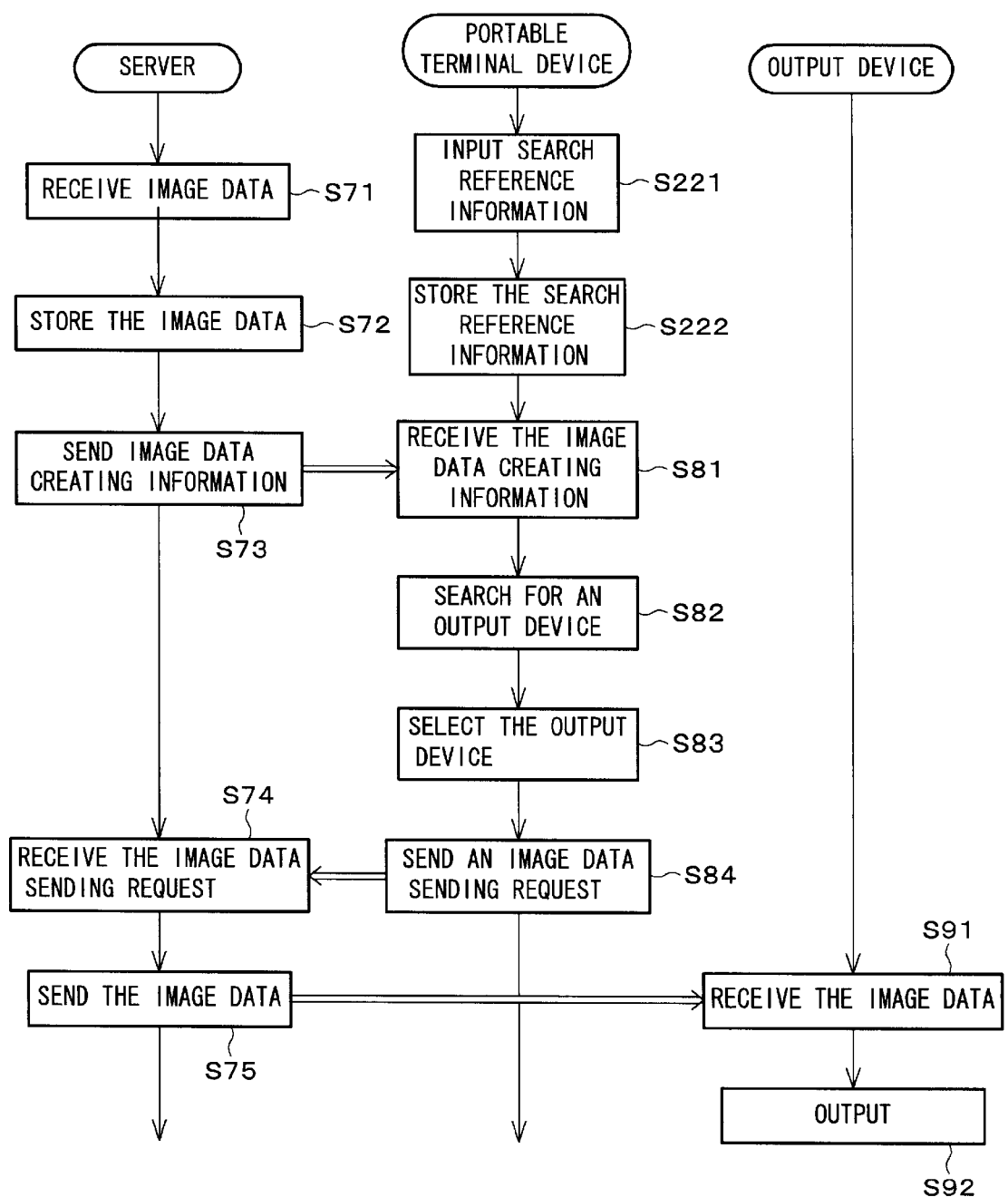
FIG. 13 is a flow chart showing data output processes in the case of setting a search condition.

The following will explain a setting procedure for a search condition with reference to FIG. 13. First of all, the user 79 uses an input device of the portable terminal device 73 to input necessary search conditions selected from output device information (S221) and stores the inputted search conditions, as reference information for the search, in the storage means (S222). Further, when searching for the output device 74, the reference information thus stored is read out, thereby detecting the output devices 74 meeting the conditions while taking account of the distance (the distance between two points, the distance when a transportation network is considered, etc.) between the portable terminal device 73 and the output device 74 calculated based on the image data creation information and the current location information of the portable terminal device 73, adequate means for reaching the output device 74 (on foot, by car, etc.), and the current status of the user 79 (for example, currently travelling by car or train, etc.). This makes it possible to search for a particular printer, for example, of the following status: within reach in ten minutes by train; double-sided color printing is available; a print count is 20 sheets/min; and 200 sheets of A4-sized paper are ready in a tray. Note that, the rest of the data output method is the same as above.

Alternatively, in the case where the output device information is retrieved from an external database via the network, as shown in FIG. 14, the portable terminal device 73, upon receipt of image data creation information, instructs an output device information server having the database to send the desired output device information, thereby receiving the output device information thus sent from the output device information server (S231). The output device 74 is detected based on the output device information in accordance with search conditions.

Further, it is set that, after selecting the output device 74 either arbitrarily or automatically, an output request is automatically sent to the server 72. This can cut some steps in the operation by the user 79. Moreover, it is possible to make the output device 74 to start output as soon as the user comes within a few meters to the output device 74.

Next, a second data output method will be explained. As shown in FIG. 15, when the output device 74 is not directly connected with the server 72 via the communications line, and when an output request is sent from the portable terminal device 73 to the server 72, the server 72 sends image data to the portable terminal device 73. The portable terminal device 73 is then connected with the output device 74 via a wireless communications line 81, and a mode to send the image data to the output device 74 that was selected when the image data was received becomes available. Note that, the configuration of the data output system is the same as the foregoing, and the rest of the data output method is the same as the first method.

As discussed, even when the output device 74 is of a 'stand alone' type, it can forward image data via the portable terminal device 73, in so far as it has a wireless communications mode. In addition, the output device 74 can output image data even when not connected with the server 72 via a communications line. Therefore, the search object includes the output devices 74 off the network, thereby enlarging the range of selection by the user 79. Moreover, it is also possible to display image data at the portable terminal device 73. This enables the user to check the content of display as to whether or not it should be printed, and if not required, an output request is not made, thereby preventing unnecessary output.

Figure 16:
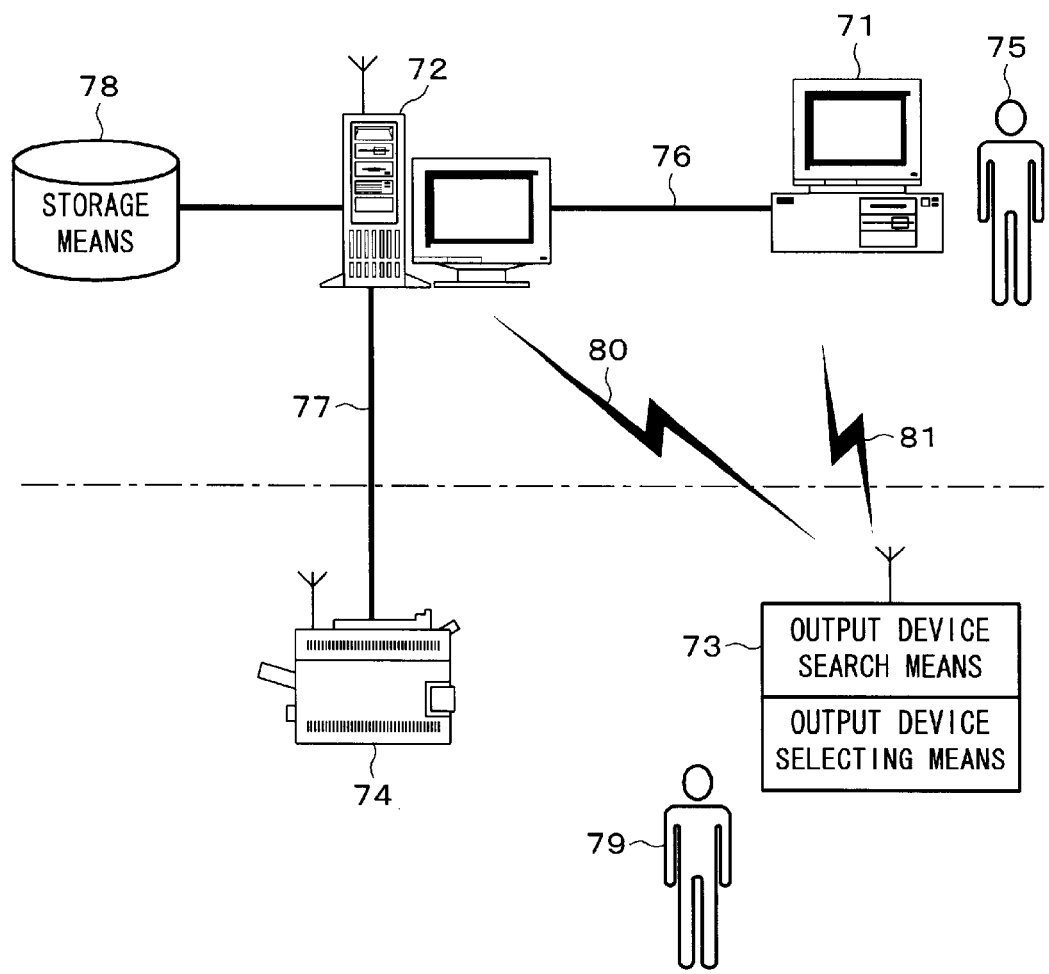
FIG. 16 is an explanatory view showing a third data output method for the data output system.

Further, a third data output method will be explained. As shown in FIG. 16, the client 71 sends image data to the server 72, while sending image data creation information and the server ID of the server 72 storing the image data to the portable terminal device 73. Note that, the client 71 and the portable terminal device 73 may communicate with each other directly or via a different server in between. Further, the portable terminal device 73 which has received the image data creation information and the server ID selects the output device 74 and sends an output request and an output ID to the server 72. The server 72, upon receipt of the output request, sends the desired image data to the designated output device 74. Note that, the configuration of the data output system is the same as the foregoing, and the rest of the data output method is the same as the first method.

As discussed, the client 71 sends image data and image data creation information to different addressees, thereby making it possible to search for the output device 74 by the portable terminal device 73 while sending the image data and omit sending the image data creation information from the server 72 to the portable terminal device 73, thus reducing communications costs in its entirety.

Further, when the server ID of the server 72 storing the image data is already known to the client 71 and the portable terminal device 73, the following method is preferred: sending the image data creation information alone from the client 71 to the portable terminal device 73 enables the portable terminal device 73 to send an output request to the server 72, thereby further reducing communications costs.

Meanwhile, a software program for allowing either of the first to third methods above to properly function is stored in a recording medium and supplied to either the system or each device. By reading out and executing the program stored in the recording medium, data output function is realized. Examples of the recording medium include: a floppy disk, a hard disk, an optical disk, a magneto-optical disk, a CD-ROM, a CD-R, a magnetic tape, a memory card, a ROM, and suchlike.

Note that, the present invention is not limited to the foregoing embodiments, and the embodiments can of course be corrected or modified to a large extent in so far as such correction or modification is made within the scope of the present invention. For example, a client and a portable terminal device, which are normally independent of each other, can be identical. In that case, a user him/herself can create image data and output it from a desired output device.

Further, in order to inhibit the unauthorized output of image data, it is arranged that, when image data creation information is sent to the portable terminal device, a password is sent simultaneously, and when an output request is sent from the portable terminal device to the server, a password is also sent simultaneously. The password thus sent from the portable terminal device is checked by the server. If the received password is identical with the registered password, image data is sent to an output device. If not identical, it is understood that a third party other than the user is attempting to illegally access and obtain the image data. In that case, however, the image data is not sent to the output device, thereby preventing image data from being leaked to the third party.

The print service system according to the present invention may have an arrangement which includes a plurality of print devices connected with a broadband network, a print server managing the respective print devices connected with the broadband network via the broadband network, and a mail server which is connected with the broadband network and relays an e-mail directed to a wireless phone. Further, the mail server is provided with receipt notifying means for notifying, upon receipt of an e-mail containing attached data, the wireless phone of the receipt of the e-mail, and attached data separation ID sending means for separating the attached data from the received e-mail and sending the separate attached data and the user ID to the print server. The print server is provided with storage means for storing the attached data and the user ID by matching them, and search means for searching for the corresponding attached data based on the user ID. Each of the print devices has ID input means for inputting the user ID and notifies the print server of the user ID inputted from either of the plurality of print devices. The print server searches for attached data corresponding to the notified user ID and transferring it to the print device so that the attached data is printed out.

First of all, in a conventional print service system, when using a wireless phone to receive an e-mail and the e-mail contains attached data of a kind which cannot be displayed by that wireless phone, the whole e-mail is sent to a mail server or a terminal capable of recognizing the attached data so as to print it out. This raises problems, such as an increase in unnecessary communications processes, hence in communications costs. In addition, another problem is that an addressee should come to the mail server or a place where a printer to which an e-mail is forwarded is provided so as to receive the printed document.

In the present invention, the print service system includes a plurality of print devices connected with a broadband network, a print server managing the respective print devices connected with the broadband network via the broadband network, and a mail server which is connected with the broadband network and relays an e-mail directed to a wireless phone. Therefore, providing a plurality of print devices on different sites in a scattered manner allows the user simply to fetch the printed document from the nearest place where the print device is provided. Thus, the user is not required to come to the mail server or the e-mail forwarding destination, that is convenient.

Next, in the present invention, the mail server is provided with receipt notifying means for notifying, upon receipt of an e-mail containing attached data, the wireless phone of the receipt of the e-mail, and attached data separation ID sending means for separating the attached data from the received e-mail and sending the separate attached data and the user ID to the print server.

Therefore, the mail server, when receiving an e-mail containing attached data, notifies a wireless phone of the receipt of the e-mail containing the attached data by the receipt notifying means, thereby allowing the user, who is the owner of the wireless phone, to learn the arrival of the e-mail containing the attached data.

Meanwhile, the attached data separation ID transfer means of the mail server separates the attached data from the received e-mail, thereafter sending the separate attached data and the user ID to the print server.

Here, since the print server has the storage means for storing the attached data and the user ID by matching them, when the attached data and the user ID are sent to the print server, the attached data is matched with the user ID and stored in the storage means.

Next, each of the print devices has the ID input means for inputting the user ID. This allows the user to input the user ID at either of the plurality of print devices.

Further, when the user inputs the user ID to either one of the plurality of print devices, the print device notifies the print server of it.

Based on this notification, the print server, which has the search means for searching for the corresponding attached data based on the user ID, uses the search means to search for the attached data corresponding to the notified user ID and transfers the retrieved attached data to the print device where the user ID is inputted, so that the print device prints out the attached data.

As a result, even when receiving an e-mail containing attached data somewhere outside the home or the office, the user can print out the attached data as required at the nearest site, that is, by the nearest print device.

Further, when printing, not the whole e-mail containing the attached data but the attached data alone can be sent to the print device so as to be printed out. This greatly reduces sending costs compared to the case where the main body of an e-mail is obtained by the wireless phone, and the whole e-mail is further sent to the print device.

Accordingly, it is possible to provide a print service system capable of printing attached data of a kind which cannot be recognized by some mobile devices including a mobile phone, by a nearest printer connected with a broadband network, without increasing communications cost.

The print service system according to the present invention, in the foregoing print service system, may have an arrangement in which the print server has converting means for converting attached data to print data in such a format which enables print by a print device that issued the print request.

With this invention, the print server has converting means for converting attached data to print data in such a format which enables print by a print device which issued a print request.

Accordingly, in the case where the attached data is written in a special image format and cannot directly be printed by some of the print devices, the data converting means of the print server converts the attached data to print data in the format that enables print by the print device that issued the print request. Therefore, the print device should not necessarily be of a high-grade model which can handle the special image format.

As a result, the attached data of an e-mail in any format can be printed by the nearest print device.

The print service system according to the present invention, in the foregoing print service system, may have an arrangement in which the mail server can match an e-mail address with the phone number of a wireless phone that is the receiving terminal, as the user ID. In addition, the ID input means of the print device is made up of phone number obtaining means whereby a wave sent from the approaching wireless phone is received so as to obtain the phone number. The phone number thus obtained by the phone number obtaining means is utilized as the user ID.

With this arrangement, the mail server can match an e-mail address with the phone number of a wireless phone which is the receiving end, as the user ID. Further, the ID input means of the print device is made up of the phone number obtaining means for receiving a wave sent from the approaching wireless phone so as to obtain the phone number, and the phone number obtained by the phone number obtaining means is used as the user ID. Note that, the phone number obtaining means is capable of obtaining the phone number of an ordinary wireless phone, such as a mobile phone, by catching a weak radio wave of the phone that is constantly sent so as to notify the location of the phone.

As a result, the user is required only to approach the print device with the wireless phone so as to cause the phone number obtaining means of the print device to obtain the phone number of the wireless phone by catching the wave sent from the approaching wireless phone. The phone number thus obtained is used as the user ID in the mail server in which an e-mail address is matched with the phone number of the wireless phone to which the e-mail is directed.

Accordingly, the user is not required to input the user ID directly to the ID input means of the print device. Namely, the user ID that is the phone number can be inputted to the print device simply by approaching the print device.

As a result, the user can skip inputting the user ID to the print device so as to print out the attached data.

Thus, it is possible to provide a print service system having superior operability.

The print service system according to the present invention, in the foregoing print service system, may have an arrangement in which the mail server is provided with confirmation means for confirming a method for manipulating attached data with respect to the wireless phone.

With this invention, the mail server is provided with confirmation means for converting a method for manipulating attached data with respect to the wireless phone.

Therefore, the mail server can check by the confirmation means what manipulation is required for the attached data by the user.

As a result, since it is possible to ask the user whether the attached data should be printed, unnecessary printing can be prevented.

The print service system according to the present invention, in the foregoing print service system, may have an arrangement in which each of the print devices on one hand has phone number notifying means which notifies the print server of the phone number obtained at the phone number obtaining means, and the print server on the other hand starts forwarding the attached data corresponding to the notified phone number.

With this invention, the print device on one hand has phone number notifying means which notifies the print server of the phone number obtained at the phone number obtaining means, and the print server on the other hand starts forwarding the attached data corresponding to the notified phone number.

Accordingly, the phone number notifying means of the print device notifies the print server of the phone number obtained at the phone number obtaining means, thereby enabling the print server to start forwarding the attached data corresponding to the notified phone number.

As a result, prior to the user's print instruction, the print server can forward the attached data to the print device in advance. Again, as explained, the user's approach to the print device causes the print server to forward attached data to the print device in advance.

Consequently, when the user gives the print instruction, the print device already received the forwarded attached data from the print server, thereby enabling the device to immediately start printing.

This allows the user to shorten standby time before printing actually starts.

Further, means to solve the problem according to the present invention is such that, when image data that should be outputted is created, a portable terminal device having a communications mode is utilized to select an optimum output device by the user/owner's search for an output device suitable for output, thereby constructing a data output system capable of output of the image data by the selected output device.

This system includes a client for creating image data, an output device for outputting the image data, a portable terminal device for performing an output request for the image data and selecting the output device, and a server for transferring the image data, which are set to communicate with one another by constant or temporary connection with a network.

Therefore, the client has means for sending the server the image data and an identification code of the portable terminal device with which image data creation information should be notified. The portable terminal device has means for selecting an output device for outputting the image data and for sending the server an output request for the image data and an identification code of the selected output device.

The server has means for storing the image data received from the client and for notifying the portable terminal device designated by the client of the image data creation information and an identification code of the server itself, and for sending the image data to the output device selected according to the output request from the portable terminal device. The output device has means for outputting the image data received from the server.

Accordingly, when the client has created image data that should be known by the user, the image data is sent from the client to the server, while sending the identification code of the portable terminal device. Upon receipt thereof, the server notifies the portable terminal device of the creation information of the image data and an identification code of the server itself. The user, who was notified of the emergence of the image data, uses the portable terminal device to select an output device that should output the image data according to a desired condition, thereafter sending the server the output request for the image data and information on the selected output device. When the server which received the output request sends the image data to the selected output device, the output device outputs the received image data. The user can thus freely select an output device so as to obtain the image data through the desired output device.

Note that, the client may send the image data creation information directly to the portable terminal device. In that case, the client has means for sending the created image data to the server and for notifying the portable terminal device of the image data creation information. The portable terminal device has means for selecting, upon receipt of the notification of the image data creation information, an output device with which the image data should be outputted, and for sending the server an output request for the image data and information on the selected output device. The server has means for sending the image data to the output device selected according to the output request from the portable terminal device, and the output device has means for outputting the image data received from the server.

Here, by notifying the user of the emergence of the image data that should be outputted, the user can promptly identify the presence of the image data and take a next measure at once. Therefore, when the server either sends a notifying signal indicative of the emergence of the image data immediately after receiving the image data, or sends a notifying signal to the portable terminal device when the client has created the image data, the user can learn the emergence of the image data by receiving the signal at the portable terminal device.

Each of the foregoing systems is preferable in the case where the server and the output device are directly connected via a communications line, that realizes the high-speed transmission of image data, thereby obtaining output results promptly. In the case where the direct connection between the output device and the server is not available, it may be arranged that the image data is sent to the output device from the server via the portable terminal device. In that case, the output device is provided with a wireless communications mode so as to send image data from the portable terminal device to the output device. Alternatively, the portable terminal device and the output device are directly connected via an interface so as to send image data by serial or parallel transmission.

Next, a method for selecting an output device by a portable terminal will be explained. The output device is searched for based on information on the output device and the image data creation information, thereby selecting one of a plurality of output devices detected as a result of the search. Here, the portable terminal device obtains output device information necessary for the search from a database, thereby detecting the output device based on the image data creation information. The database is included in either of the server, the client, the output device, and a server which is different from the server above, and enables the portable terminal device to retrieve output device information from the database via a network. By thus utilizing the database, the portable terminal device no longer needs to hold output device information and, moreover, can obtain the latest information, thereby performing a search with higher accuracy. Note that, the portable terminal device itself may have the database.

Criteria in the selection of the output device include: the distance between the user and the output device, the location of the output device, means to reach the output device, the location of the portable terminal device, user's status, the performance of the output device, the status of the output device and the data forwarding performance of communications means, charges, or an index obtained by combining all of these. The output device is searched for based on these criteria, so that output devices in compliance with the search conditions are detected, and an optimum output device is then selected therefrom and confirmed either by the user or automatically. Consequently, the user can select an output device provided within a predetermined range of the distance or the location, or select the output device based on either of the following criteria: the location of a mobile terminal, the user's status, the performance of the output device, the status of the output device, the data forwarding performance of the communications means, charges required for output, and a combination of two or more of these conditions, thus remarkably increasing the user's convenience.

Further, it is recommended that notification be given when the output device is detected by a search, or the output device meeting a predetermined requirement is detected as a result of the search. By thus given notification, the user is no longer required to keep an eye on the outcome of the search, thereby being allowed to do something else during the time of the search. Thus allowing the user to effectively use the time greatly improves the user's convenience.

Further, in the portable terminal device, after selecting the output device, an output request for image data may automatically be sent, or it is also possible that the whole process of a search, selection and an output request for the output device may automatically be performed. Therefore, the user no longer needs operation for selecting the output device or for sending the output request.

As is clear from the foregoing explanation, in the present invention, when such image data that should be outputted emerges, the use of the portable terminal device enables the user to efficiently search for, and select, an optimum output device. Accordingly, the user should no longer make the effort to find an output device. Namely, the user can readily obtain image data through a desired output device, such as the one provided in the vicinity, thereby largely shortening time between the emergence of image data at the client to the user's acquisition of the image data.

Further, in the selection of an output device, output device information can be obtained from an external database, thereby the information no longer requires to be held, thus requiring no large capacity of a memory or the like. Further, by updating the data of the database with the information of output devices provided lately, it is possible to obtain the latest output device information, thereby allowing the user to use such new output devices. Moreover, the user can learn the current status of an output device, thereby enabling the user to select an output device by avoiding those occupied or out of order. This greatly saves the user's time which is conventionally wasted so as to await output and/or repeat searches.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A data output system, comprising:
a data providing section for specifying data; and
a data output section including a mobile terminal which the data providing section notifies of data information that is unique to the data specified by the data providing section, and a plurality of output devices including a specified output device which receives the data specified by the data providing section from the data providing section so as to output it;
wherein the data output section, based on input for specifying the specified output device from a user of the mobile terminal which received the data information to the mobile terminal or the specified output device, sends specified output device information for specifying an output device from which data indicated by the data information is outputted, and a data sending request which is a request for sending the data to the specified output device, with respect to the data providing section, and
wherein the data providing section sends the data to the specified output device, so that the specified output device receives the data and outputs it.

2. The data output system set forth in claim 1, wherein:
the specified output device sends the data sending request directed thereto to the data providing section, and the data providing section sends the data to the specified output device, so that the specified output device receives the data and outputs it.

3. The data output system set forth in claim 2, wherein:
each of the plurality of output devices includes instruction receiving means for receiving an instruction, which selects it as the specified output device, from a user of the mobile terminal.

4. The data output system set forth in claim 1, wherein:
the mobile terminal specifies the specified output device while sending a data sending request by which data is sent to the specified output device to the data providing section, and the data providing section sends the data to the specified output device, so that the specified output device receives the data and outputs it.

5. The data output system set forth in claim 4, wherein:
after specifying the specified output device for outputting the data sent from the data providing section, the mobile terminal sends a data sending request with respect to the specified output device in the absence of the instruction from the user, to the data providing section.

6. The data output system set forth in claim 1, wherein:
the data providing section includes a provider terminal for specifying the data, and a server for receiving destination information indicative of a destination of the data information from the provider terminal, sending the data information to a mobile terminal indicated in the destination information and sending the specified data to the output device.

7. The data output system set forth in claim 6, wherein:
the provider terminal sends the data to the server, and
the server receives the data from the provider terminal and sends it to the output device.

8. The data output system set forth in claim 1, wherein:
the data providing section includes a provider terminal for specifying the data and sending the data information to a mobile terminal which is the destination of the data information, and a server for sending the specified data to the output device.

9. The data output system set forth in claim 8, wherein:
the provider terminal sends the data to the server, and
the server receives the data from the provider terminal and sends it to the output device.

10. The data output system set forth in claim 1, wherein:
the data providing section includes a provider terminal for sending the data to the server, and the server for receiving the data from the provider terminal and sends it to the output device.

11. The data output system set forth in claim 10, wherein:
the data is created at the provider terminal.

12. The data output system set forth in claim 11, wherein:
the data providing section notifies the mobile terminal of the presence of the created data in the provider terminal.

13. The data output system set forth in claim 10, wherein:
the provider terminal sends data directed to the output device and combined data which is data combined with mobile terminal-use data directed to the mobile terminal, to the server, and
the server receives the combined data from the provider terminal, separates the combined data into the mobile terminal-use data and the data directed to the output device, and sends the mobile terminal-use data to the mobile terminal while sending the data directed to the output device to the output device.

14. The data output system set forth in claim 13, wherein:
the mobile terminal-use data is text data, and the data directed to the output device is image data.

15. The data output system set forth in claim 1, wherein:
the data providing section converts data directed to the specified output device to data in such a format that enables output by the specified output device.

16. The data output system set forth in claim 15, wherein:
the data providing section stores data formats which enables output by all types of output devices, respectively.

17. The data output system set forth in claim 15, wherein:
the data providing section is notified by the specified output device of one of the data formats enabling output by that output device.

18. The data output system set forth in claim 1, wherein:
the data output section sends terminal unique information which can specify the mobile terminal to the data providing section, and
the data providing section searches for data corresponding to the received terminal unique information and sends the data retrieved to the specified output device.

19. The data output system set forth in claim 18, wherein:
the specified output device recognizes the terminal unique information and sends it to the data providing section.

20. The data output system set forth in claim 19, wherein:
when sensing the presence of the mobile terminal, the specified output device recognizes the terminal unique information of that mobile terminal.

21. The data output system set forth in claim 20, wherein:
when sensing the presence of the mobile terminal, the specified output device recognizes the terminal unique information of that mobile terminal based on a signal used by the mobile terminal to communicate with the data providing section.

22. The data output system set forth in claim 21, wherein:
the mobile terminal uses a wireless phone to communicate with the data providing section, and
when sensing the presence of the mobile terminal, the specified output device identifies as the terminal unique information of that mobile terminal the phone number of the mobile terminal based on a signal of the wireless phone used to communicate with the data providing section.

23. The data output system set forth in claim 18, wherein:
the mobile terminal sends the terminal unique information to the specified output device.

24. The data output system set forth in claim 23, wherein:
the mobile terminal has a phone mode, and the terminal unique information is the phone number of the mobile terminal.

25. The data output system set forth in claim 1, wherein:
when notified by the data providing section of data information, the mobile terminal instructs the data providing section how to manipulate data indicated by the data information.

26. The data output system set forth in claim 1, wherein:
the data providing section inquires of the mobile terminal how to manipulate the data to be sent and manipulates the data pursuant to an answer to the inquiry.

27. The data output system set forth in claim 1, wherein:
when a plurality of data to be sent exist, the data providing section notifies a mobile terminal of it,
the mobile terminal selects one of the plurality of data for output at the specified output device and notifies the data providing section of the selected data, and
the data providing section sends the selected data to the specified output device.

28. The data output system set forth in claim 1, further comprising:
an output device information storage section storing information on the plurality of output devices,
wherein:
the mobile terminal obtains information on the plurality of output devices from the output device information storage section, and specifies the output device to output data based on the data information and the information on the plurality of output devices.

29. The data output system set forth in claim 28, wherein:
the output device information storage section is independent of the data providing section and the data output section.

30. The data output system set forth in claim 28, wherein:
the mobile terminal notifies a user thereof that a search for all output devices which are ready to communicate with the data providing section is finished.

31. The data output system set forth in claim 28, wherein:
the mobile terminal notifies the user thereof that the output devices meeting a search condition set by the user have been detected.

32. The data output system set forth in claim 28, wherein:
the mobile terminal has a search condition storing section for storing search conditions for specifying an output device from which the data is outputted and focuses on the output device based on the search conditions.

33. The data output system set forth in claim 28, wherein:
the mobile terminal notifies the user thereof that an output device which is located within a predetermined range of the distance between the mobile terminal and the output device has been detected.

34. The data output system set forth in claim 1, wherein:
the data providing section notifies the mobile terminal of information on each output device.

35. The data output system set forth in claim 1, wherein:
the data providing section notifies the mobile terminal of proposed output device information indicative of proposed output devices which are selected from the plurality of output devices as being available for data output.

36. The data output system set forth in claim 35, wherein:
the proposed output device information is prepared by selecting the output devices according to a criterion that the distance between the output device and the mobile terminal is small.

37. The data output system set forth in claim 35, wherein:
the data providing section and the output device are directly connected via a communications line.

38. The data output system set forth in claim 1, wherein:
the data is sent from the data providing section to the output device via the mobile terminal.

39. The data output system set forth in claim 1, wherein:
a plurality of output devices which can be the specified output devices are provided within the data output section.

40. The data output system set forth in claim 1, wherein:
the output device is a print device for printing out the data.

41. The data output system set forth in claim 1, wherein:
the output device is an image display device for displaying the data on a screen.

42. The data output system set forth in claim 1, wherein:
the data directed to the output device is image data.

43. The data output system set forth in claim 1, wherein:
the data providing section and the output device are connected so that constant communications are available, and the data providing section and the mobile terminal are connected only when they communicate with each other.

44. The data output system set forth in claim 1, wherein:
the data providing section and the mobile terminal communicate with each other by wireless communications.

45. The data output system set forth in claim 1, wherein:
the mobile terminal is a mobile phone.

46. A mobile terminal which is adopted in a data output system including a data providing section for specifying data and a plurality of output devices including a specified output device for receiving the data specified by the data providing section from the data providing section so as to output it,
the mobile terminal sends specified output device information for specifying an output device from which data indicated by the data information is outputted, and a data sending request which is a request for sending the data to the specified output device, with respect to the data providing section, based on input for specifying the specified output device from a user of the mobile terminal, when the mobile terminal is notified by the data providing section of data information which is unique to the data specified by the data providing section.

47. A data output method, which outputs data in a data output system including a data providing section for specifying data and a plurality of output devices including a specified output device for receiving the data specified by the data providing section from the data providing section so as to output it, the data output method comprising the steps of:

notifying data information from a data providing section for specifying data to a mobile terminal, the data information being unique to the data specified by the data providing section;

sending specified output device information and a data sending request from the mobile terminal or the specified output device based on input for specifying the specified output device from a user of the mobile terminal to the mobile terminal or the specified output device when the mobile terminal is notified by the data providing section of the data information, the specified output device information being for specifying an output device from which data indicated by the data information is outputted, and the data sending request being a request for sending the data to the specified output device, with respect to the data providing section;

sending the data specified by the data providing section from the data providing section to the specified output device; and outputting the data sent from the data providing section by the specified output device.

48. A program to be executed by a computer, which outputs data in a data output system including a data providing section for specifying data and a plurality of output devices including a specified output device for receiving the data specified by the data providing section from the data providing section so as to output it, said program comprising the steps of:

notifying data information from a data providing section for specifying data to a mobile terminal, the data information being unique to the data specified by the data providing section;

sending specified output device information and a data sending request from the mobile terminal or the specified output device based on input for specifying the specified output device from a user of the mobile terminal to the mobile terminal or the specified output device, when the mobile terminal is notified by the data providing section of the data information, the specified output device information being for specifying an output device from which data indicated by the data information is outputted, and the data sending request being a request for sending the data to the specified output device, with respect to the data providing section;

sending the data specified by the data providing section from the data providing section to the specified output device; and outputting the data sent from the data providing section by the specified output device.

49. A computer-readable recording medium storing a program to be executed by a computer, which outputs data in a data output system including a data providing section for specifying data and a plurality of output devices including a specified output device for receiving the data specified by the data providing section from the data providing section so as to output it, the program comprising the steps of:

notifying data information from a data providing section for specifying data to a mobile terminal, the data information being unique to the data specified by the data providing section;

sending specified output device information and a data sending request from the mobile terminal or the specified output device based on input for specifying the specified output device from a user of the mobile terminal to the mobile terminal or the specified output device, when the mobile terminal is notified by the data providing section of the data information, the specified output device information being for specifying an output device from which data indicated by the data information is outputted, and the data sending request being a request for sending the data to the specified output device, with respect to the data providing section;

sending the data specified by the data providing section from the data providing section to the specified output device; and outputting the data sent from the data providing section by the specified output device.

* * * * *